US010348177B2

United States Patent
Lu

(10) Patent No.: US 10,348,177 B2
(45) Date of Patent: Jul. 9, 2019

(54) DISPLACEMENT DEVICES, MOVEABLE STAGES FOR DISPLACEMENT DEVICES AND METHODS FOR FABRICATION, USE AND CONTROL OF SAME

(71) Applicant: The University of British Columbia, Vancouver (CA)

(72) Inventor: Xiaodong Lu, Vancouver (CA)

(73) Assignee: The University of British Columbia, Vancouver (CA)

( * ) Notice: Subject to any disclaimer, the term of this patent is extended or adjusted under 35 U.S.C. 154(b) by 275 days.

(21) Appl. No.: 15/378,825

(22) Filed: Dec. 14, 2016

(65) Prior Publication Data

US 2017/0163140 A1    Jun. 8, 2017

Related U.S. Application Data

(63) Continuation of application No. PCT/CA2015/050549, filed on Jun. 12, 2015.
(Continued)

(51) Int. Cl.
*H02K 41/03* (2006.01)
*H02P 25/064* (2016.01)
*H02P 25/066* (2016.01)

(52) U.S. Cl.
CPC ......... *H02K 41/031* (2013.01); *H02P 25/064* (2016.02); *H02K 2201/18* (2013.01); *H02K 2213/03* (2013.01); *H02P 25/066* (2016.02)

(58) Field of Classification Search
CPC ...... H02K 41/02; H02K 41/031; H02K 1/278; H02K 2201/18; H02K 1/17; H02P 8/00; H02P 25/06; H02N 15/00
(Continued)

(56) References Cited

U.S. PATENT DOCUMENTS 3,376,578 A    4/1968    Sawyer
3,894,276 A    7/1975    Janssen
(Continued)

FOREIGN PATENT DOCUMENTS

CN    201956875 U    8/2011
EP    1357434    10/2003
(Continued)

OTHER PUBLICATIONS

Cho et al., "Magnetic Field Analysis of 2-D Permanent Magnet Array for Planar Motor", IEEE Tran. On Magnetics, 2001, vol. 37 No. 5, pp. 3762-3766.
(Continued)

*Primary Examiner* — Quyen P Leung
*Assistant Examiner* — Leda T Pham
(74) *Attorney, Agent, or Firm* — Todd A. Rattray; Oyen Wiggs Green & Mutala LLP

(57) ABSTRACT

A displacement device comprises a stator comprising non-parallel stator-x and stator-y elongated traces. The device comprises a moveable stage comprising a first magnet array comprising first magnetization segments linearly elongated in a stage-x direction and having magnetization directions generally orthogonal to the stage-x direction. The first magnet array comprises a first pair of adjacent first magnetization segments comprising two first magnetization segments adjacent to one another in a stage-y direction non-parallel to the stage-x direction. Each first magnetization segment in the first pair has a corresponding magnetization direction oriented at a corresponding angle $\alpha_n$ about a corresponding stage-x axis as measured from a positive stage-z direction that is generally orthogonal to both the stator-x and stator-y directions. The corresponding angle $\alpha_n$ is one of $45°+n90°$ where n is any integer. Each first
(Continued)

magnetization segment in the first pair has a different magnetization direction.

20 Claims, 16 Drawing Sheets

Related U.S. Application Data

(60) Provisional application No. 62/012,304, filed on Jun. 14, 2014.

(58) Field of Classification Search
USPC .................................................... 310/12.19
See application file for complete search history.

(56) References Cited

U.S. PATENT DOCUMENTS

| | | | |
|---|---|---|---|
| 4,535,278 A | 8/1985 | Asakawa | |
| 4,654,571 A | 3/1987 | Hinds | |
| 4,835,424 A | 5/1989 | Hoffman et al. | |
| 5,196,745 A | 3/1993 | Trumper | |
| 5,334,892 A | 8/1994 | Chitayat | |
| 5,925,956 A | 7/1999 | Ohzeki | |
| 6,003,230 A | 12/1999 | Trumper et al. | |
| 6,005,309 A | 12/1999 | Chitayat | |
| 6,069,418 A | 5/2000 | Tanaka | |
| 6,072,251 A | 6/2000 | Markle | |
| 6,097,114 A | 8/2000 | Hazelton | |
| 6,144,119 A | 11/2000 | Hazelton | |
| 6,208,045 B1 | 3/2001 | Hazelton et al. | |
| 6,252,234 B1 | 6/2001 | Hazelton et al. | |
| 6,304,320 B1 | 10/2001 | Tanaka et al. | |
| 6,339,266 B1 | 1/2002 | Tanaka | |
| 6,437,463 B1 | 8/2002 | Hazelton et al. | |
| 6,441,514 B1 | 8/2002 | Markle | |
| 6,445,093 B1 | 9/2002 | Binnard | |
| 6,452,292 B1 | 9/2002 | Binnard | |
| 6,495,934 B1 | 12/2002 | Hayashi et al. | |
| 6,531,793 B1 | 3/2003 | Frissen et al. | |
| 6,590,355 B1 | 7/2003 | Kikuchi et al. | |
| 6,650,079 B2 | 11/2003 | Binnard | |
| 6,710,495 B2 | 3/2004 | Lipo et al. | |
| 6,720,680 B1 | 4/2004 | Tanaka | |
| 6,777,896 B2 | 8/2004 | Teng | |
| 6,835,941 B1 | 12/2004 | Tanaka | |
| 6,847,134 B2 * | 1/2005 | Frissen ............... | H02K 41/031 310/12.05 |
| 6,879,063 B2 | 4/2005 | Frissen et al. | |
| 6,885,430 B2 | 4/2005 | Tanaka et al. | |
| 6,949,844 B2 | 9/2005 | Cahill et al. | |
| 6,987,335 B2 * | 1/2006 | Korenaga ............ | G03F 7/70758 310/12.15 |
| 7,057,370 B2 | 6/2006 | Touzov | |
| 7,075,198 B2 | 7/2006 | Korenaga | |
| 7,084,534 B2 | 8/2006 | Ohishi | |
| 7,199,493 B2 | 4/2007 | Ohishi | |
| 7,224,252 B2 | 5/2007 | Meadow, Jr. et al. | |
| 7,227,284 B2 | 6/2007 | Korenaga | |
| 7,436,135 B2 | 10/2008 | Miyakawa | |
| 7,550,890 B2 | 6/2009 | Kloeppel et al. | |
| 7,696,653 B2 | 4/2010 | Tanaka | |
| 7,808,133 B1 | 10/2010 | Widdowson et al. | |
| 7,948,122 B2 | 5/2011 | Compter et al. | |
| 8,031,328 B2 | 10/2011 | Asano et al. | |
| 8,046,904 B2 | 11/2011 | Kloeppel et al. | |
| 8,129,984 B2 | 3/2012 | Hosek et al. | |
| 8,384,317 B2 | 2/2013 | Shikayama et al. | |
| 8,593,016 B2 | 11/2013 | Pelrine et al. | |
| 8,686,602 B2 | 4/2014 | Pelrine et al. | |
| 8,736,133 B1 | 5/2014 | Smith et al. | |
| 9,202,719 B2 | 12/2015 | Lu et al. | |
| 9,685,849 B2 | 6/2017 | Lu et al. | |
| 2002/0149270 A1 | 10/2002 | Hazelton | |
| 2002/0149271 A1 | 10/2002 | Bartolotti | |
| 2002/0180395 A1 | 12/2002 | Binnard | |
| 2003/0085627 A1 | 5/2003 | Lipo et al. | |
| 2004/0007920 A1 | 1/2004 | Teng | |
| 2004/0140780 A1 | 7/2004 | Cahill et al. | |
| 2005/0001579 A1 | 1/2005 | Touzov | |
| 2005/0090902 A1 | 4/2005 | Masini | |
| 2005/0093378 A1 | 5/2005 | Ohishi | |
| 2005/0194843 A1 | 9/2005 | Korenaga | |
| 2005/0194918 A1 | 9/2005 | Takeuchi | |
| 2006/0175993 A1 | 8/2006 | Shibata et al. | |
| 2006/0214518 A1 | 9/2006 | Ohishi | |
| 2007/0035267 A1 | 2/2007 | Gao et al. | |
| 2007/0046127 A1 | 3/2007 | Kloeppel et al. | |
| 2007/0046221 A1 | 3/2007 | Miyakawa | |
| 2007/0145831 A1 | 6/2007 | Antonius Theodorus Dams | |
| 2008/0203828 A1 * | 8/2008 | Compter ............ | G03F 7/70758 310/12.06 |
| 2008/0285005 A1 | 11/2008 | Gery et al. | |
| 2008/0290741 A1 | 11/2008 | Cardon et al. | |
| 2009/0058199 A1 | 3/2009 | Ito | |
| 2009/0195195 A1 | 8/2009 | Huang | |
| 2009/0251678 A1 | 10/2009 | Ohishi | |
| 2009/0315413 A1 | 12/2009 | Iwatani et al. | |
| 2010/0090545 A1 | 4/2010 | Binnard et al. | |
| 2010/0167556 A1 | 7/2010 | Totsu et al. | |
| 2010/0238425 A1 | 9/2010 | Binnard | |
| 2011/0050007 A1 | 3/2011 | Kubo | |
| 2011/0062901 A1 | 3/2011 | Busch | |
| 2011/0101896 A1 | 5/2011 | Shikayama et al. | |
| 2012/0113405 A1 | 5/2012 | Yang et al. | |
| 2012/0127447 A1 | 5/2012 | Yang et al. | |
| 2012/0139455 A1 | 6/2012 | Tojo et al. | |
| 2012/0300186 A1 | 11/2012 | Butler et al. | |
| 2013/0140372 A1 | 6/2013 | Mahadeswaraswamy et al. | |
| 2013/0164687 A1 | 6/2013 | Binnard et al. | |
| 2013/0241575 A1 | 9/2013 | Finkler | |
| 2014/0285122 A1 | 9/2014 | Lu et al. | |
| 2015/0097498 A1 | 4/2015 | Hemati et al. | |
| 2015/0137624 A1 | 5/2015 | Wu et al. | |
| 2015/0338750 A1 | 11/2015 | Yang et al. | |
| 2016/0065043 A1 | 3/2016 | Lu et al. | |

FOREIGN PATENT DOCUMENTS

| | | |
|---|---|---|
| JP | 08006642 A | 1/1996 |
| JP | 2002112526 | 4/2002 |
| JP | 2003209963 | 7/2003 |
| JP | 2004047981 | 2/2004 |
| JP | 2004254489 | 9/2004 |
| TW | 201330485 | 7/2013 |
| WO | 2001018944 | 3/2001 |
| WO | 20050909202 | 9/2005 |
| WO | 2013059934 | 5/2013 |
| WO | 2015017933 | 2/2015 |
| WO | 2015179962 | 12/2015 |
| WO | 2015184553 | 12/2015 |
| WO | 2015188281 | 12/2015 |
| WO | 2016012157 | 1/2016 |
| WO | 2016012158 | 1/2016 |
| WO | 2016012159 | 1/2016 |
| WO | 2016012160 | 1/2016 |
| WO | 2016012171 | 1/2016 |
| WO | 2016091441 | 6/2016 |

OTHER PUBLICATIONS

Filho, A.F.F., "Investigation of the Forces Produced by a New Electromagnetic Planar Actuator", Electric Machines and Drives Conference, IEMDC 2001. IEEE International, pp. 8-13.

Filho, A.F., "Analysis of a DC XY-Actuator", XIX International Conference on Electrical Machines—ICEM 2010, Rome.

Filho, A.F., "Development of a novel planar actuator", Ninth International Conference on Electrical Machines and Drives, Conference Publication No. 468, 1999.

Fujii et al., "X-Y Linear Synchronous Motors Without Force Ripple and Core Loss for Precision Two-Dimensional Drives", IEEE Transactions on Magnetics, vol. 38, No. 5, Sep. 2002.

(56) References Cited

OTHER PUBLICATIONS

Buckley et al., "Step- and-scan lithography using reduction optics", J. Vae. Sci. Technol. B 7 (6), Nov./Dec. 1989.

Hesse et al., "Interferometric Controlled Planar Nanopositioning System With 100 MM Circular Travel Range", ASPE 2011 Annual Meeting, Denver, Co.

Tomita et al., "Study on a surface-motor driven precise positioning system", Journal of Dynamic Systems, Measurement, and Control Sep. 1995, vol. 117/311-319.

Ueda et al., "A planar actuator with a small mover traveling over large yaw and translational dispalcements", IEEE Transactions on Magnetics, vol. 44, No. 5, May 2008.

Kajiyama et al., "Development of ironless type surface motor", XIX International Conference on Electrical Machines—ICEM 2010, Rome.

Shinno et al., "A Newly Developed Linear Motor-Driven Aerostatic X-Y Planar Motion Table System for Nano-Machining", Annals of the CIRP, 2007, 56/1:369-372.

Gao et al., "A surface motor-driven planar motion stage integrated with an XYθZ surface encoder for precision positioning", Precision Engineering, 2004, 28/3:329-337.

In et al., "Design of a planar-type high speed parallel mechanism positioning platform with the capability of 180 degrees orientation", Annals of the CIRP, 2008, 57/1:421-424.

Lee et al., "Dynamic Modeling and Control of a Ball-Joint-Like Variable-Reluctance Spherical Motor", Journal of Dynamic Systems, Measurement, and Control, 1996, 118/1:29-40.

Weck et al., "Design of a Spherical Motor with Three Degrees of Freedom", Annals of the CIRP, 2000, 49/1:289-294.

Hollis et al., "A six-degree-of-freedom magnetically levitated variable compliance fine-motion wrist: Design, modeling, control", IEEE Trans. Robot. Automat, 1991, 7/3:320-332.

Verma et al., "Six-axis nanopositioning device with precision magnetic levitation technology", IEEE Tran. On Mechatronics, 2004, 9/2:384-391.

Kim et al., "High-precision magnetic levitation stage for photolithography", Precision Engineering, 1998, 22/2:66-77.

Holmes et al., "The Long-Range Scanning Stage: a Novel Platform for Scanned-Probe Microscopy", Precision Engineering, 2000, 24/3:191-209.

Etxaniz et al., "Magnetic Levitated 2D Fast Drive", IEEJ Transactions on Industry Applications, 2006, 126/12:1678-1681.

Compter, J., "Electro-dynamic planar motor", Precision Engineering, 2003, 28/2: 171-180.

Jansen et al., "Modeling of magnetically levitated planar actuators with moving magnets", IEEE Tran. Magnetic, 2007, 43/1:15-25.

Trumper et al., "Magnet arrays for synchronous machines", IEEE Industry Applications Society Annual Meeting, 1993, 1:9-18.

Jansen et al., "Magnetically Levitated Planar Actuator with Moving Magnets", IEEE Tran. Ind. App.,vol. 44, No. 4, 2008.

Kim, W.J., "High-Precision Planar Magnetic Levitation", Massachusetts Institute of Technology, Jun. 1997.

Jansen, J.W., "Magnetically levitated planar actuator with moving magnets: Electromechanical analysis and design", IOP-EMVT, SenterNovem, an agency of the Dutch Ministry of Economic Affairs, 2007.

Khan et al., "A Long Stroke Electromagnetic XY Positioning Stage for Micro Applications", IEEE/ASME Transactions on Mechatronics, vol. 17, No. 5, Oct. 2012, pp. 866-875.

Xiaodong Lu et al.: 6D direct-drive technology for planar motion stages, CIRP Annals, vol. 61, No. 1, pp. 359-362, XP028511153, ISSN: 0007-8506, DOI: 10.1016/J.CIRP.2012.03.145.

\* cited by examiner

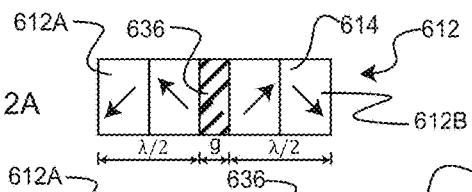
FIGURE 12A
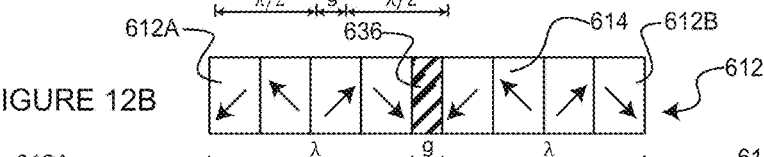
FIGURE 12B
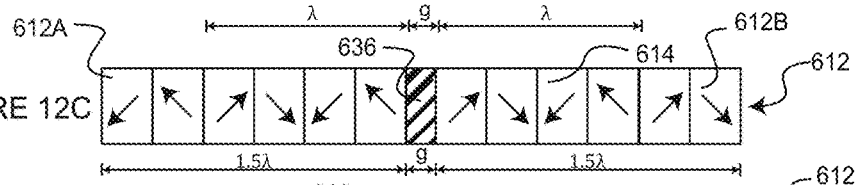
FIGURE 12C
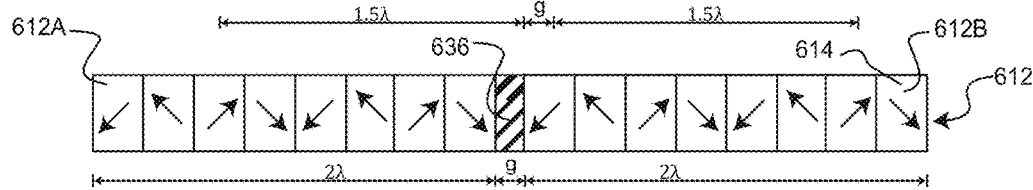
FIGURE 12D
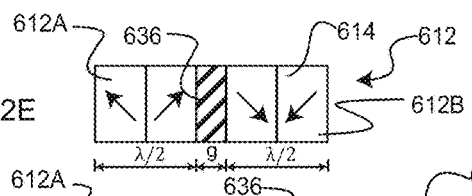
FIGURE 12E
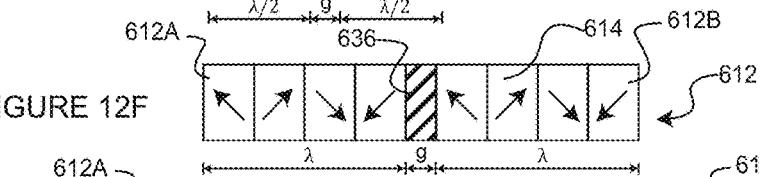
FIGURE 12F
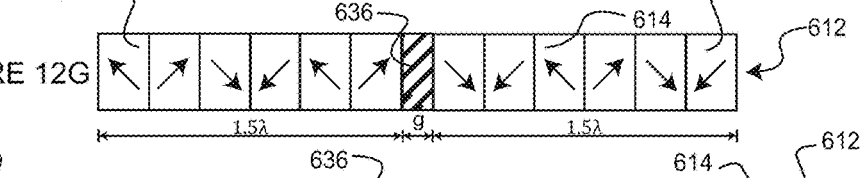
FIGURE 12G
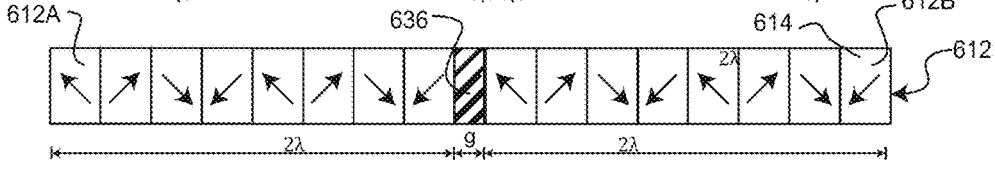
FIGURE 12H
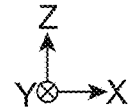

DISPLACEMENT DEVICES, MOVEABLE STAGES FOR DISPLACEMENT DEVICES AND METHODS FOR FABRICATION, USE AND CONTROL OF SAME

RELATED APPLICATIONS

This application is a continuation of Patent Cooperation Treaty (PCT) application No. PCT/CA2015/050549 having an international filing date of 12 Jun. 2015 and entitled DISPLACEMENT DEVICES, MOVEABLE STAGES FOR DISPLACEMENT DEVICES AND METHODS FOR FABRICATION, USE AND CONTROL OF SAME, which in turn claims the benefit of the priority of U.S. application No. 62/012,304 filed 14 Jun. 2014 and entitled DISPLACEMENT DEVICES AND METHODS FOR FABRICATION, USE AND CONTROL OF SAME. PCT application No. PCT/CA2015/050549 and U.S. application No. 62/012,304 are hereby incorporated herein by reference.

TECHNICAL FIELD

The invention relates to displacement devices. Particular embodiments provide displacement devices comprising movable stages with magnet arrays, moveable stages for such displacement devices and methods for fabrication, use and control of same.

BACKGROUND

Motion stages (XY tables and rotary tables) are widely used in various manufacturing, inspection and assembling processes. A common solution currently in use achieves XY motion by stacking two linear stages (i.e. a X-stage and a Y-stage) together via connecting bearings.

A more desirable solution involves having a single moving stage capable of XY motion, eliminating additional bearings. It might also be desirable for such a moving stage to be able to provide at least some Z motion. Attempts have been made to design such displacement devices using the interaction between current-carrying coils and permanent magnets. Examples of efforts in this regard include the following: U.S. Pat. Nos. 6,003,230; 6,097,114; 6,208,045; 6,441,514; 6,847,134; 6,987,335; 7,436,135; 7,948,122; US patent publication No. 2008/0203828; W. J. Kim and D. L. Trumper, High-precision magnetic levitation stage for photolithography. *Precision Eng.* 22 2 (1998), pp. 66-77; D. L. Trumper, et al, "Magnet arrays for synchronous machines", IEEE Industry Applications Society Annual Meeting, vol. 1, pp. 9-18, 1993; and J. W. Jansen, C. M. M. van Lierop, E. A. Lomonova, A. J. A. Vandenput, "Magnetically Levitated Planar Actuator with Moving Magnets", IEEE Tran. Ind. App., Vol 44, No 4, 2008.

More recent techniques for implementing displacement devices having a moveable stage and a stator are described in:
- PCT application No. PCT/CA2012/050751 (published under WO/2013/059934) entitled DISPLACEMENT DEVICES AND METHODS FOR FABRICATION, USE AND CONTROL OF SAME; and
- PCT application No. PCT/CA2014/050739 (published under WO/2015/017933) entitled DISPLACEMENT DEVICES AND METHODS AND APPARATUS FOR DETECTING AND ESTIMATING MOTION ASSOCIATED WITH SAME.

There is a general desire to provide displacement devices having characteristics that improve upon those known in the prior art.

The foregoing examples of the related art and limitations related thereto are intended to be illustrative and not exclusive. Other limitations of the related art will become apparent to those of skill in the art upon a reading of the specification and a study of the drawings.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 12A-12H schematically depict cross-sectional views of a number of magnet arrays which could be used in any of the elongated segment magnet array assemblies described herein according to particular embodiments.

DESCRIPTION

Figure 1A:
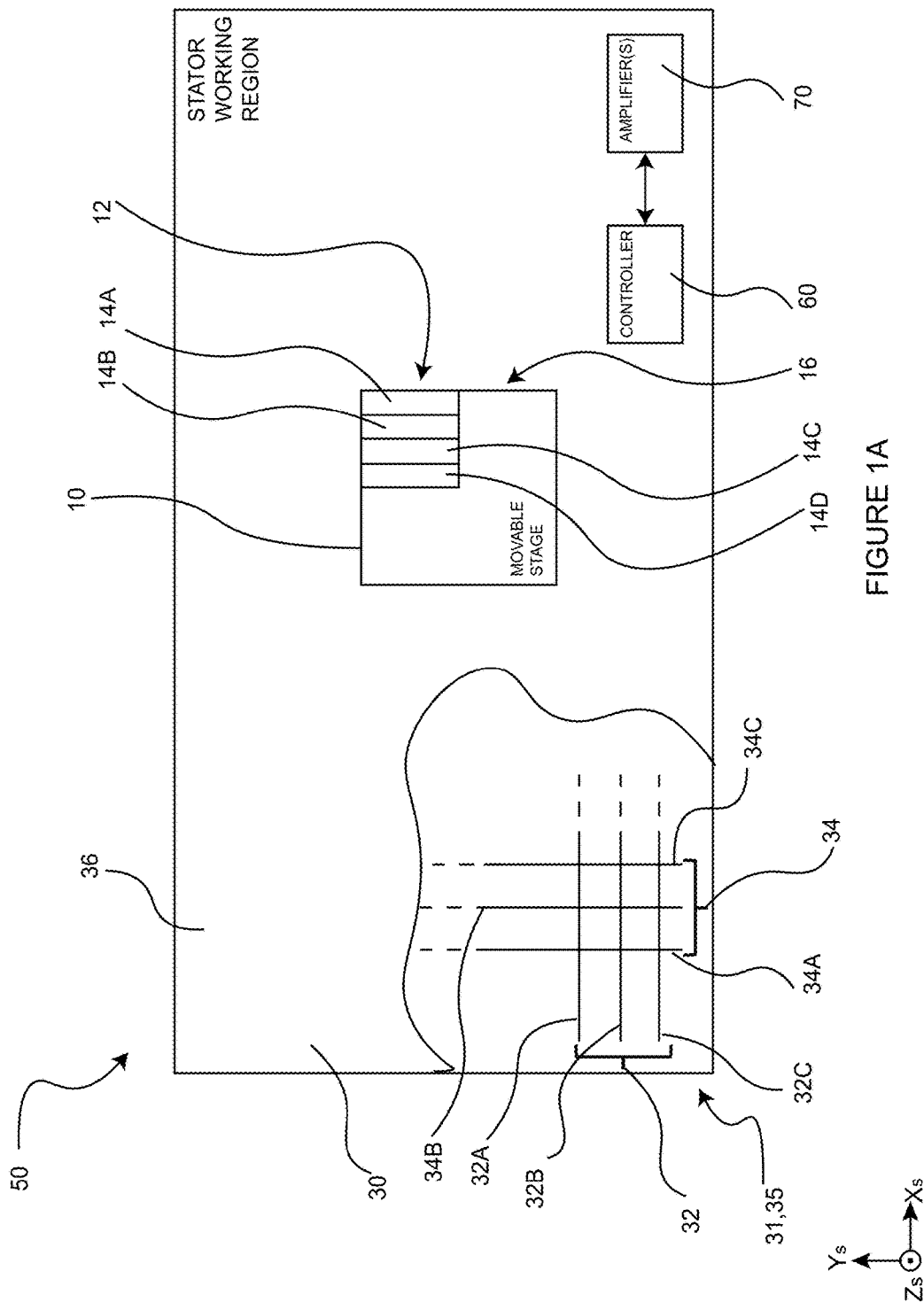
FIGS. 1A and 1B (together, FIG. 1) respectively depict a schematic partially cut-away top view and side cross-sectional views of a displacement device according to a particular embodiment of the invention.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Aspects of the invention provide displacement devices for moving a moveable stage relative to a stator. The stator comprises an x-trace layer comprising a plurality of electrically conductive x-traces which extend generally linearly in a stator-x direction across an excitation region and into which currents may be driven; and a y-trace layer comprising a plurality of electrically conductive y-traces which extend generally linearly in a stator-y direction across the excitation region and into which currents may be driven. The x-trace layer and the y-trace layer may overlap one another in a stator-z direction over the excitation region. The stator-x direction and the stator-y direction are non-parallel (e.g. generally orthogonal) to one another and the stator-z direction is generally orthogonal to both the stator-x and stator-y directions. The moveable stage comprises: a first magnet array comprising a plurality of first magnetization segments linearly elongated in a stage-x direction, each first magnetization segment having a corresponding magnetization direction generally orthogonal to the stage-x direction; and a second magnet array comprising a plurality of second magnetization segments linearly elongated in a stage-y direction, each second magnetization segment having a corresponding magnetization direction generally orthogonal to the stage-y direction. The stage-x direction and the stage-y direction are non-parallel (e.g. orthogonal) to one another. The first magnet array may comprise one or more first pairs of adjacent first magnetization segments, each first pair of adjacent first magnetization segments comprising two first magnetization segments adjacent to one another in the stage-y direction, wherein, for each first pair of adjacent first magnetization segments: each first magnetization segment in the first pair has a corresponding magnetization direction that is oriented at a corresponding angle $\alpha_n$ about a corresponding stage-x axis aligned with the stage-x direction as measured from a positive stage-z direction that is generally orthogonal to both the stage-x and stage-y directions and wherein the corresponding angle $\alpha_n$ is one of 45°+n90° where n is any integer; and each first magnetization segment in the first pair has a different magnetization direction. The second magnet array may comprise one or more second pairs of adjacent second magnetization segments, each second pair of adjacent second magnetization segments comprising two second magnetization segments adjacent to one another in the stage-x direction, wherein, for each second pair of adjacent second magnetization segments: each second magnetization segment in the second pair has a corresponding magnetization direction that is oriented at a corresponding angle $\alpha_m$ about a corresponding stage-y axis aligned with the stage-y direction as measured from the positive stage-z direction and wherein the corresponding angle $\alpha_n$ is one of 45°+m90° where m is any integer; and each second magnetization segment in the second pair has a different magnetization direction. The displacement device may also comprise a controller connected to one or more amplifiers, the controller and the one or more amplifiers configured to drive currents in the x-traces and the y-traces to move the moveable stage relative to the stator.

Another aspect of the invention provides a displacement device for moving a moveable stage relative to a stator. The stator comprises: an x-trace layer comprising a plurality of electrically conductive x-traces which extend generally linearly in a stator-x direction across an excitation region and into which currents may be driven; and a y-trace layer comprising a plurality of electrically conductive y-traces which extend generally linearly in a stator-y direction across the excitation region and into which currents may be driven. The x-trace layer and the y-trace layer may overlap one another in a stator-z direction over the excitation region. The stator-x direction and the stator-y direction may be non-parallel (e.g. generally orthogonal) to one another and the stator-z direction may be generally orthogonal to both the stator-x and stator-y directions. The moveable stage comprises: a first magnet array comprising a plurality of first magnetization segments linearly elongated in a stage-x direction, each first magnetization segment having a corresponding magnetization direction generally orthogonal to the stage-x direction. The first magnet array may comprise one or more first pairs of adjacent first magnetization segments, each first pair of adjacent first magnetization segments comprising two first magnetization segments adjacent to one another in a stage-y direction non-parallel (e.g. generally orthogonal) to the stage-x direction. For each first pair of adjacent first magnetization segments: each first magnetization segment in the first pair has a corresponding magnetization direction that is oriented at a corresponding angle $\alpha_n$ about a corresponding stage-x axis aligned with the stage-x direction as measured from a positive stage-z direction that is generally orthogonal to both the stator-x and stator-y directions and wherein the corresponding angle $\alpha_n$ is one of 45°+n90° where n is any integer; and each first magnetization segment in the first pair has a different magnetization direction. The displacement device may comprise a controller connected to one or more amplifiers, the controller and the one or more amplifiers configured to drive currents in the x-traces and the y-traces to move the moveable stage relative to the stator.

Another aspect of the invention provides a displacement device for moving a moveable stage relative to a stator. The stator comprises: an x-trace layer comprising a plurality of electrically conductive x-traces which extend generally linearly in a stator-x direction across an excitation region and into which currents may be driven; and a y-trace layer comprising a plurality of electrically conductive y-traces which extend generally linearly in a stator-y direction across the excitation region and into which currents may be driven. The x-trace layer and the y-trace layer may overlap one another in a stator-z direction over the excitation region. The stator-x direction and the stator-y direction may be non-parallel (e.g. generally orthogonal) to one another and the stator-z direction generally orthogonal to both the stator-x and stator-y directions. The moveable stage comprises: a first magnet array consisting exclusively of one or more first magnetization segments linearly elongated in a stage-x direction, each first magnetization segment having a corresponding magnetization direction that is oriented at a corresponding angle $\alpha_n$ about a corresponding stage-x axis aligned with the stage-x direction as measured from a positive stage-z direction and wherein the corresponding angle $\alpha_n$ is one of 45°+n90° where n is any integer; and a second magnet array consisting exclusively of one or more second magnetization segments linearly elongated in a stage-y direction, each second magnetization segment having a corresponding magnetization direction that is oriented at a corresponding angle $\alpha_m$ about a corresponding stage-y axis aligned with the stage-y direction as measured from the positive stage-z direction and wherein the corresponding angle $\alpha_m$ is one of 45°+m90° where m is any integer. The stage-x direction and the stage-y direction may be non-parallel (e.g. generally orthogonal) to one another and the stage-z direction is generally orthogonal to both the stage-x and stage-y directions. The device may also comprise a controller connected to one or more amplifiers, the controller and the one or more amplifiers configured to drive currents in the x-traces and the y-traces to move the moveable stage relative to the stator.

Another aspect of the invention provides a displacement device for moving a moveable stage relative to a stator. The stator comprises: an x-trace layer comprising a plurality of electrically conductive x-traces which extend generally linearly in a stator-x direction across an excitation region and into which currents may be driven; and a y-trace layer comprising a plurality of electrically conductive y-traces which extend generally linearly in a stator-y direction across the excitation region and into which currents may be driven. The x-trace layer and the y-trace layer may overlap one another in a stator-z direction over the excitation region. The stator-x direction and the stator-y direction may be non-parallel (e.g. generally orthogonal) to one another and the stator-z direction generally orthogonal to both the stator-x and stator-y directions. The moveable stage comprises: a first magnet array comprising a plurality of first magnetization segments linearly elongated in a stage-x direction, each first magnetization segment having a corresponding magnetization direction generally orthogonal to the stage-x direction and at least two of the first magnetization segments having magnetization directions that are different from one another; and a second magnet array comprising a plurality of second magnetization segments linearly elongated in the stage-x direction, each second magnetization segment having a corresponding magnetization direction generally orthogonal to the stage-x direction and at least two of the second magnetization segments having magnetization directions that are different from one another. Corresponding edges of the first and second magnet arrays elongated in the stage-x direction may be spaced apart from one another in a stage-y direction generally orthogonal with the stage-x direction by a spacing parameter $S_m$ given by $$S_m = N_S \frac{\lambda}{2} + \frac{\lambda}{4},$$

where $N_S$ is a positive integer and $\lambda$ is a spatial period. The device may also comprise a controller connected to one or more amplifiers, the controller and the one or more amplifiers configured to drive currents in the x-traces and the y-traces to move the moveable stage relative to the stator.

Methods are also provided for fabrication and/or use of such displacement devices.

Aspects of the invention provide displacement devices which comprise a stator and one or more moveable stages. For brevity, moveable stages may also be referred to herein as movers. The stator comprises a plurality of electrically conductive coils shaped to provide pluralities of generally linearly elongated coil traces. Each moveable stage may be moveable relative to the stator within a two-dimensional working region of the displacement device. Each moveable stage may comprise one or more magnet arrays. In some embodiments, each magnet array comprises a plurality of magnetization segments, where each magnetization segment has a corresponding magnetization direction. Each magnet array may comprise at least two magnetization segments with different magnetization directions. One or more amplifiers may be connected to drive a plurality of currents in the plurality of coil traces. A controller may be connected to deliver control signals to the one or more amplifiers. The control signals may be used to control current driven by the one or more amplifiers into at least some of the plurality of coil traces. The currents controllably driven into the at least some of the plurality of coil traces create magnetic fields which cause corresponding magnetic forces on the one or more magnet arrays of the moveable stage, thereby moving the moveable stage relative to the stator (e.g. within the working region). In some embodiments, the magnetic forces associated with the interaction between the magnetic fields created by the currents in the at least some of the coil traces and the magnetic fields associated with the magnet arrays may attract the moveable stage toward the stator at all times when the controller is controlling the currents driven by the one or more amplifiers. In some embodiments, the magnetic forces associated with the interaction between the magnetic fields created by the currents in the at least some of the coil traces and the magnetic fields associated with the magnet arrays may force the moveable stage away from the stator to balance gravitational forces with an air gap at all times when the controller is controlling the currents driven by the one or more amplifiers.

Figure 1B:
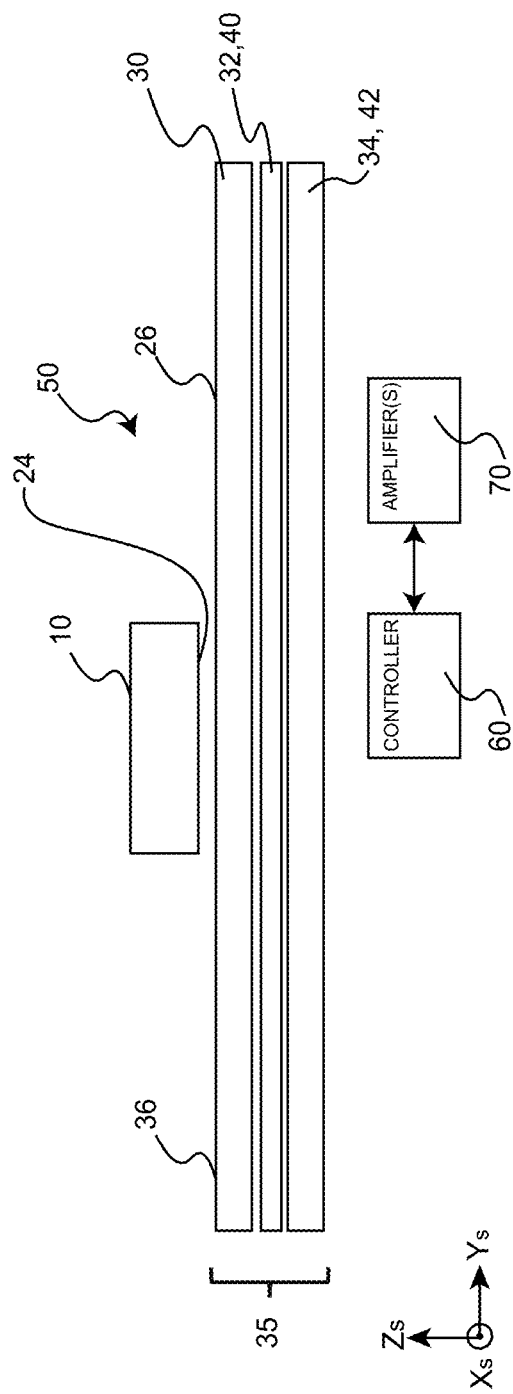

FIGS. 1A and 1B (together FIG. 1) respectively depict a partially cut-away top view and a side cross-sectional view of a displacement device 50 according to a particular embodiment. Displacement device 50 comprises a stator 30, a moveable stage 10, a controller 60 and one or more amplifiers 70. Moveable stage 10 may be controllably moved relative to stator 30 about a working region 36 of displacement device 50.

For purposes of describing the displacement devices disclosed herein, it can be useful to define a pair of coordinate systems—a stator coordinate system which is fixed to the stator (e.g. to stator 30 of FIG. 1A); and a stage coordinate system which is fixed to the moveable stage (e.g. moveable stage 10 of FIG. 1A) and moves with the moveable stage relative to the stator and the stator coordinate system. This description may use conventional Cartesian coordinates (x, y, z) to describe these coordinate systems, although, it will be appreciated that other coordinate systems could be used. For convenience and brevity, in this description and the associated drawings, the directions (e.g. x, y, z directions) in the stator coordinate system and the directions in the stage coordinate system may be shown and described as being coincident with one another—i.e. the stator-x, stator-y and stator-z directions may be shown as coincident with stage-x, stage-y and stage-z directions, respectively. Accordingly, this description and the associated drawings may refer to directions (e.g. x, y, and/or z) to refer to directions in both or either of the stator and stage coordinate systems. However, it will be appreciated from the context of the description herein that in some embodiments and/or circumstances, the moveable stage (e.g. moveable stage 10) may move relative to the stator (e.g. stator 30) such that these stator and stage directions are no longer coincident with one another. In such cases, this disclosure may adopt the convention of using the terms stator-x, stator-y and stator-z to refer to directions and/or coordinates in the stator coordinate system and the terms stage-x, stage-y and stage-z to refer to directions and/or coordinates in the stage coordinate system. In this description and the associated drawings, the symbols Xm, Ym and Zm may be used to refer respectively to the stage-x, stage-y and stage-z directions, the symbols Xs, Ys and Zs may be used to refer respectively to the stator-x, stator-y and stator-z directions and the symbols X, Y and Z may be used to refer respectively to either or both of the stage-x, stage-y and stage-z and/or stator-x, stator-y and stator-z directions. In some embodiments, during normal operation, the stage-z and stator-z directions are approximately in the same direction (e.g. within ±30° in some embodiments; within ±10° in some embodiments; and within ±20 in some embodiments).

In some embodiments, the stator-x and stator-y directions are non-parallel. In particular embodiments, the stator-x and stator-y directions are generally orthogonal. In some embodiments, the stator-z direction may be generally orthogonal to both the stator-x and stator-y directions. In some embodiments, the stage-x and stage-y directions of a particular moveable stage are non-parallel. In particular embodiments, the stage-x and stage-y directions of a particular moveable stage are generally orthogonal. In some embodiments, stage-z direction of a particular moveable stage may be generally orthogonal to both its stage-x and stage-y directions, where the stage-x and stage-y directions are respectively the directions of elongation of the magnetization segments of the x-magnet array and the y-magnet array of the magnet array assembly of the moveable stage. In some embodiments, stage-z direction of a particular moveable stage may be generally orthogonal to both the stator-x direction and the stator-y direction, where the stator-x and stator-y directions are respectively the directions of elongation of the x-coil traces and the y-coil traces of the stator.

Controller 60 and amplifiers 70 may be configured and connected for controllably moving moveable stage 10 relative to stator 30 in working region 36. For example, controller 60 may be configured to generate control signals and connected to provide such control signals to amplifiers 70. Amplifiers 70 may be connected to drive currents in coil traces 32, 34. In response to the control signals from controller 60, amplifiers 70 may drive current in coil traces 32, 34 of stator 30 to effect movement of moveable stage 10 relative to stator 30. In some embodiments, controller 60 is configured to move moveable stage 10 to a desired position, $(x_r, y_r)$, within working region 36, where $x_r$ is a desired position of moveable stage 10 in the stator-x direction and $y_r$ is a desired position of the moveable stage in the stator-y direction. Unless the context dictates otherwise, throughout this disclosure and the accompanying claims, when referring to a position of a moveable stage, a location of a moveable stage, movement of a moveable stage generally within a working region and/or the like, such position, location, movement and/or the like should be understood to refer to the position, location, movement and/or the like of a reference point on the moveable stage. Such reference point may be, but is not limited to, a point at the center of the magnet array assembly of the moveable stage. Such reference point could be some other location on the moveable stage. Generally, the desired position $(x_r, y_r)$ is a function of time, t, and represents where a moveable stage should be ideally located at each time, t.

The FIG. 1 displacement device 50 and its components (e.g. moveable stage 10, stator 30, controller 60, amplifiers 70 and/or the like) represent generalized embodiments of a displacement device and its components which is useful for describing the principles of operation of displacement devices according to the various embodiments described herein. Further embodiments of displacement devices and/or their components described herein may use similar reference numerals (e.g. with a preceding digit, a trailing symbol, a trailing letter and/or a trailing number) to those used to describe displacement device 50 and/or its components. Unless the context or description dictates otherwise, such displacement devices and/or their components may exhibit features and/or characteristics which may be similar to the features and characteristics of displacement device 50 and/or its components (or vice versa). For example, moveable stages 110A, 210_2 described in more detail below are moveable stages according to particular embodiments of the invention. Unless the context or description dictates otherwise, moveable stages 110A, 210_2 may have features and/or characteristics similar to those discussed herein for moveable stage 10 (or vice versa). As another example, stators 130, 230 described in more detail below are stators according to particular embodiments of the invention. Unless the context or description dictates otherwise, stators 130, 230 may have features and/or characteristics similar to those discussed herein for stator 30. Further, unless the context or description dictates otherwise, it should also be understood that when referring to features and/or characteristics of displacement device 50 and/or its components, the corresponding description should be understood to apply to any of the particular embodiments of displacement devices and/or their components.

Moveable Stage

Figure 2:
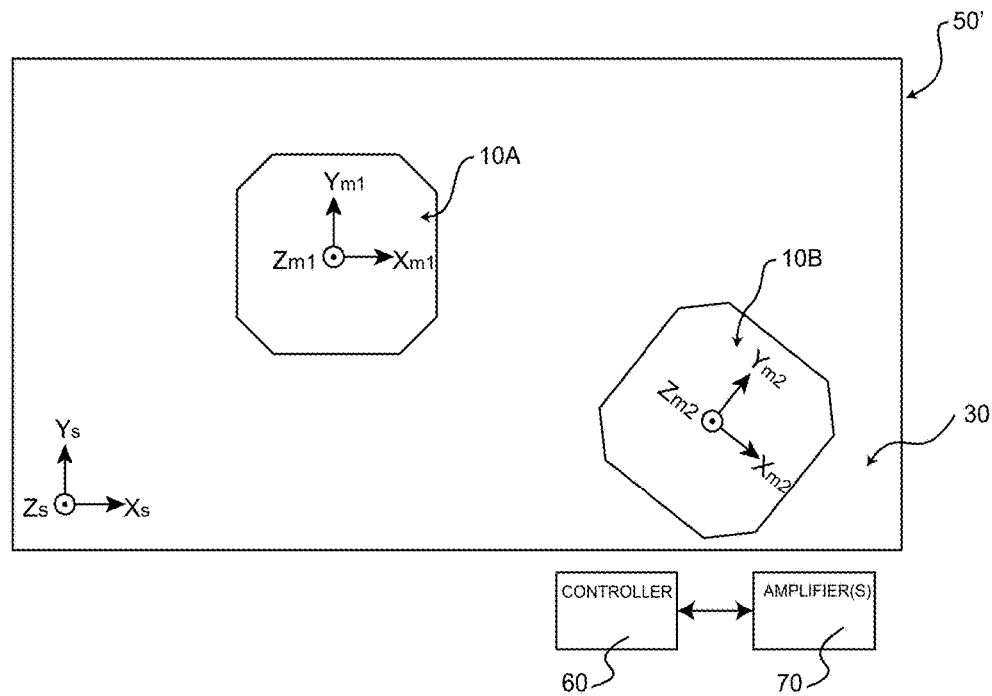
FIG. 2 is a top view of a displacement device which comprises a plurality of moveable stages.

In the FIG. 1 embodiment, displacement device 50 is shown with a single moveable stage 10. In general, however, displacement device 50 may comprise a plurality of moveable stages, each of which may be similar to moveable stage 10 and each of which may be controlled by controller 60 using amplifier(s) 70 to drive currents in coil traces 32, 34 as described herein. FIG. 2 shows a top view of displacement device 50', which comprises a plurality (e.g. two) moveable stages 10A, 10B. Controller 60 may be configured to generate control signals for controllably moving both moveable stages 10A, 10B. In other respects, displacement device 50' may be substantially similar to the FIG. 1 displacement device 50. By way of non-limiting example, each of moveable stages 10A, 10B may have similar features and/or characteristics to moveable stage 10 of displacement device 50 and stator 30 of displacement device 50' may have similar features and/or characteristics to stator 30 of displacement device 50. FIG. 2 shows that moveable stages 10A, 10B need not be aligned with one another. Consequently, each moveable stage 10A, 10B may be described using its own corresponding stage coordinate system. In the case shown in FIG. 2, the stage directions $X_{m1}/Y_{m1}/Z_{m1}$ define the stage coordinate system for moveable stage 10A and the stage directions $X_{m2}/Y_{m2}/Z_{m2}$ define the stage coordinate system for moveable stage 10B. Displacement device 50' can be built to operate with any suitable number of moveable stages 10. In some embodiments, displacement device 50' comprises three moveable stages. In some embodiments, displacement device 50' may comprise dozens to hundreds of moveable stages. In some embodiments still, displacement device 50' may comprise thousands of moveable stages.

Referring back to FIG. 1, moveable stage 10 comprises a magnet array assembly 16 which comprises one or more magnet arrays 12. Magnet array assembly 16 should be understood to comprise the combination of the one or more individual magnet arrays 12. Each magnet array 12 may comprise a corresponding plurality of magnetization segments 14A, 14B, 14C, 14D . . . (collectively, magnetization segments 14), each magnetization segment 14 having a corresponding magnetization direction. In some embodiments, the magnetization segments 14 of a particular magnet array 12 have at least two magnetization directions that are different from one another. In the FIG. 1 embodiment, moveable stage 10 comprises a first magnet array 12 having a plurality of corresponding first magnetization segments 14. Moveable stage 10 may be located adjacent to (e.g. atop) stator 30. As discussed above, in some embodiments, moveable stage 10 may be attracted toward (and bear against) stator 30 when controller 60 is controlling the currents driven by amplifiers 70; and, in some embodiments, moveable stage 10 is forced away from stator 30 (e.g. to provide an air gap between stator 30 and moveable stage 10) when controller 60 is controlling the currents driven by amplifiers 70. In the illustrated embodiment, for the sake of generality, moveable stage 10 comprises an optional stage bearing surface 24 that is generally planar (with a normal parallel to the stage-z direction) and which may bear against (or be separated by an air gap from, but most proximate to) an optional stator bearing surface 26 that is generally planar (with a normal in the stator-z direction).

One type of magnet array assembly 16 that can be used with any of the displacement devices disclosed herein is referred to as an elongated segment magnet array assembly 16. An elongated segment magnet array assembly 16 comprises one or more elongated segment magnet arrays 12, wherein each such magnet array 12 comprises plurality of linearly elongated magnetization segments 14 (e.g. elongated in a stage-x direction or a stage-y direction), with each magnetization segment 14 having a corresponding magnetization direction that is generally orthogonal to its elongation direction. At least two of the magnetization segments 14 in each magnet array 12 may have magnetization directions that are different from one another.

In some embodiments, moveable stage 10 comprises an elongated segment magnet array 16 which in turn comprises four elongated segment magnet arrays 12 (first, second, third and fourth magnet arrays 12). A first magnet array 12 in such an elongated segment magnet array assembly 16 may comprise a plurality of linearly elongated first magnetization segments 14 (e.g. elongated in a stage-x direction), with each first magnetization segment 14 having a corresponding magnetization direction that is generally orthogonal to the stage-x direction. At least two of the first magnetization segments 14 may have magnetization directions that are different from one another. The first magnetization directions of the first magnetization segments 14 may exhibit a first spatial period $\lambda_1$ (also referred to herein as $\lambda_y$) over a stage-y direction width $W_{my}$ of the first magnet array 12. In some embodiments, the first spatial period $\lambda_1$ exhibited by the first magnetization directions of the first magnetization segments 14 is the period of a Hallbach array having magnetization segments and magnetization directions similar (e.g. similar widths, magnetization directions and relative spatial order) to those of first magnet array 12. In some embodiments, the first spatial period $\lambda_1$ exhibited by the first magnetization directions of the first magnetization segments 14 is a spatial period of the magnetization directions of the magnetization segments 14 that are present in first magnet array 12. In some embodiments, the stage-y direction width $W_{my}$ of the first magnet array 12 is generally equal to $\lambda_1$, so that the first magnetization directions of the first magnetization segments 14 exhibit a single first spatial period $\lambda_1$ over the stage-y direction width $W_{my}$ of the first magnet array 12. In some embodiments, the first magnetization directions of the first magnetization segments 14 exhibit multiple (e.g. a non-unity positive integer number of) first spatial periods $\lambda_1$ which repeat over the stage-y direction width $W_{my}$ of the first magnet array 12. In some embodiments, the first magnetization directions of the first magnetization segments 14 exhibit a fraction of one or more first spatial periods $\lambda_1$ over the stage-y direction width $W_{my}$ of the first magnet array 12. For example, in some embodiments, $W_{my}=n\lambda_1/2$ or $W_{my}=n\lambda_1/4$ where n is a positive integer. In some embodiment, the number $N_t$ of different magnetization directions in first magnet array 12 may be $N_t=2$, $N_t=4$ or $N_t=8$, although this is not necessary and other values of $N_t$ are possible.

Similar to the first magnet array 12, the second magnet array 12 may comprise a plurality of linearly elongated second magnetization segments 14. However, the second magnetization segments 14 may be linearly elongated in the stage-y direction (e.g. non-parallel to the stage-x direction in some embodiments or generally orthogonal to the stage-x direction in some embodiments). Each second magnetization segment 14 has a corresponding second magnetization direction that is generally orthogonal to the stage-y direction and at least two of the second magnetization segments 14 have second magnetization directions that are different from one another. The second magnetization directions of the second magnetization segments 14 may exhibit a second spatial period $\lambda_2$ (also referred to herein as $\lambda_x$) over a stage-x direction width $W_{mx}$ of the second magnet array 12. In some embodiments, the second spatial period $\lambda_2$ exhibited by the second magnetization directions of the second magnetization segments 14 is the period of a Hallbach array having magnetization segments and magnetization directions similar (e.g. similar widths, magnetization directions and relative spatial order) to those of second magnet array 12. In some embodiments, the second spatial period $\lambda_2$ exhibited by the second magnetization directions of the second magnetization segments 14 is a spatial period of the magnetization directions of the magnetization segments 14 that are present in second magnet array 12. In some embodiments, the stage-x direction width $W_{mx}$ of the second magnet array 12 is generally equal to $\lambda_2$, so that the second magnetization directions of the second magnetization segments 14 exhibit a single second spatial period $\lambda_2$ over the stage-x direction width $W_{mx}$. In other embodiments, the second magnetization directions of the second magnetization segments 14 exhibit multiple (e.g. a non-unity integer number of) second spatial periods $\lambda_2$ which repeat over the stage-x direction width $W_{mx}$. In some embodiments, the first spatial period $\lambda_1=\lambda_y$ is equal to the second spatial period $\lambda_2=\lambda_x$ and they may both be referred to as the spatial period $\lambda$. In some embodiments, the second magnetization directions of the second magnetization segments 14 exhibit a fraction of one or more second spatial periods $\lambda_2$ over the stage-y direction width $W_{mx}$ of the second magnet array 12. For example, in some embodiments, $W_{mx}=n\lambda_2/2$ or $W_{mx}=n\lambda_2/4$ where n is a positive integer. In some embodiment, the number $N_t$ of different magnetization directions in second magnet array 12 may be $N_t=2$, $N_t=4$ or $N_t=8$, although this is not necessary and other values of $N_t$ are possible.

Similar to the first magnet array 12, the third magnet array 12 may comprise a plurality of third magnetization segments 14 linearly elongated in the stage-x direction, where each third magnetization segment 14 has a corresponding third magnetization direction that is generally orthogonal to the stage-x direction and at least two of the third magnetization segments 14 have third magnetization directions that are different from one another. The third magnetization directions of the third magnetization segments 14 may exhibit the first spatial period $\lambda_1=\lambda_y$ (or a unique third spatial period $\lambda_3$) over a stage-y direction width $W_{my}$ of the third magnet array 12. The third magnet array 12 may have properties similar to those of the first magnet array 12 in relation to the first spatial period $\lambda_1$ (or unique third spatial period $\lambda_3$) and the first spatial period $\lambda_1$ (or unique third spatial period $\lambda_3$) may have properties similar to those of first spatial period $\lambda_1$ in relation to third magnet array 12.

Similar to the second magnet array 12, the fourth magnet array 12 may comprise a plurality of fourth magnetization segments 14 linearly elongated in the stage-y direction, where each fourth magnetization segment 14 has a corresponding fourth magnetization direction that is generally orthogonal to the stage-y direction and at least two of the fourth magnetization segments 14 have fourth magnetization directions that are different from one another. The fourth magnetization directions of the fourth magnetization segments 14 may exhibit the second spatial period $\lambda_2=\lambda_x$ (or a unique fourth spatial period $\lambda_4$) over a stage-x direction width $W_{mx}$ of the fourth magnet array 12. The fourth magnet array 12 may have properties similar to those of the second magnet array 12 in relation to the second spatial period $\lambda_2$ (or unique fourth spatial period $\lambda_4$) and the second spatial period $\lambda_2$ (or unique fourth spatial period $\lambda_4$) may have properties similar to those of second spatial period $\lambda_2$ in relation to fourth magnet array 12.

Figure 3A:
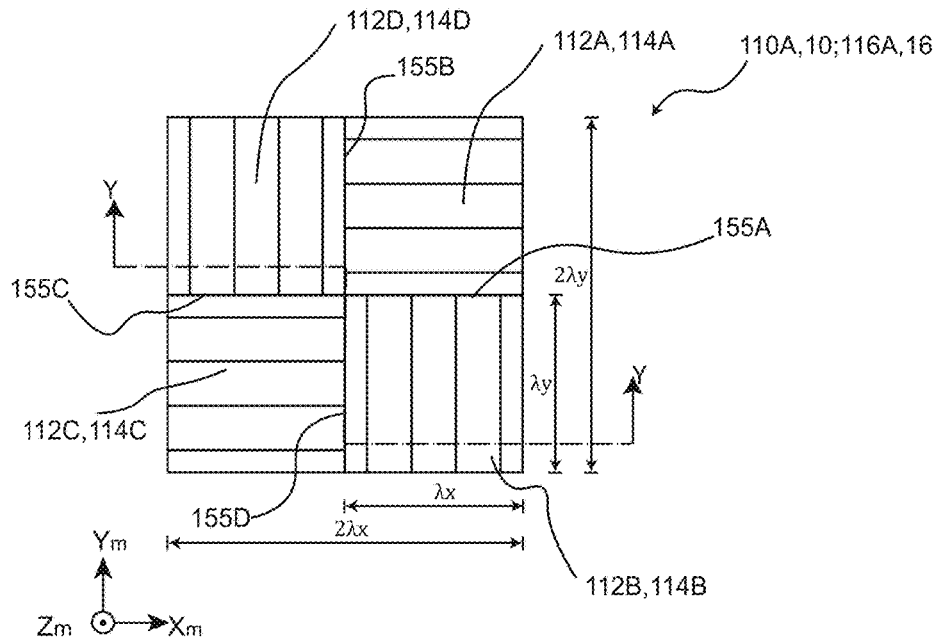
FIGS. 3A and 3B are each a schematic top view of a magnet array assembly comprising a plurality of elongated segment magnet arrays according to a particular embodiment.
Figure 3B:
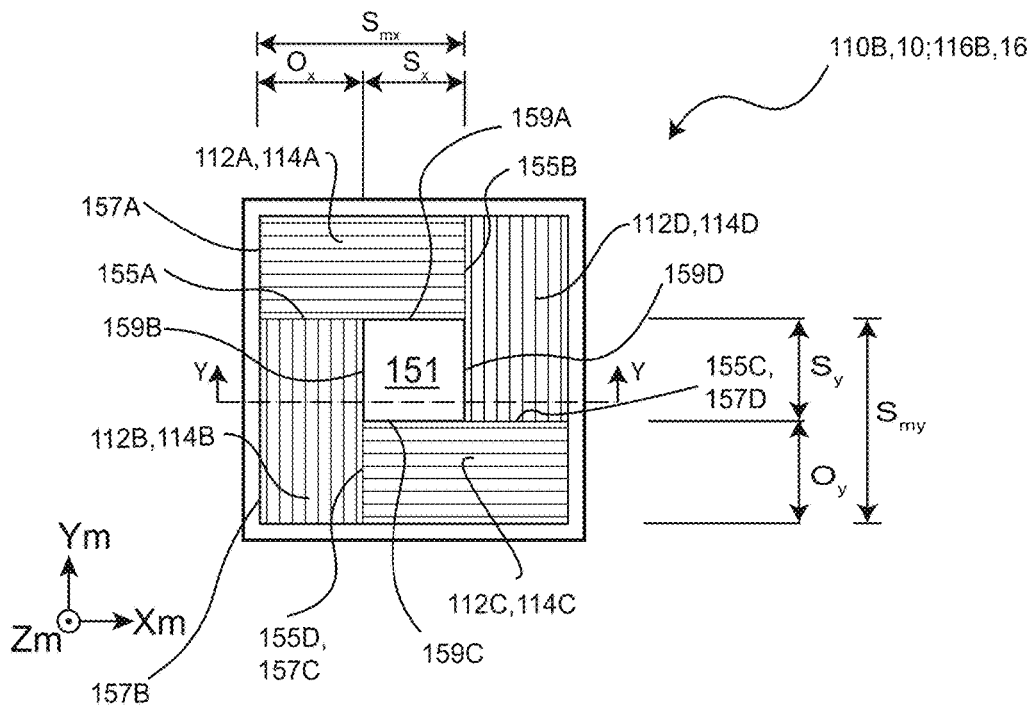

FIGS. 3A and 3B respectively depict partial schematic top views of moveable stages 110A, 110B incorporating magnet array assemblies 116A, 116B according to particular embodiments which may be used as magnet array assemblies 16 of moveable stage 10 (or any other moveable stages described herein) according to particular embodiments. Each of magnet array assemblies 116A, 116B comprises a plurality of elongated segment magnet arrays 112. In the illustrated embodiment, each of magnet array assemblies 116A, 116B comprise four elongated segment magnet arrays 112A, 112B, 112C, 112D (collectively, magnet arrays 112) which include a first magnet array 112A comprising magnetization segments 114A elongated in the stage-x direction, second magnet array 112B comprising magnetization segments 114B elongated in the stage-y direction, third magnet array 112C comprising magnetization segments 114C elongated in the stage-x direction and fourth magnet array 112D comprising magnetization segments 114D elongated in the stage-y direction. Because of their elongation directions, first and third magnet arrays 112A, 112C may be referred to as x-magnet arrays and their corresponding magnetization segments 114A, 114C may be referred to herein as x-magnetization segments and second and fourth magnet arrays 112B, 112D may be referred to as y-magnet arrays and their corresponding magnetization segments 114B, 114D may be referred to herein as y-magnetization segments. Other than for their locations and/or orientations, any of magnet arrays 112 in any one of magnet array assemblies 116A, 116B and/or in any one of moveable stages 110A, 110B may be substantially similar to one another. In this way, magnet array assemblies 116A, 116B and moveable stages 110A, 110B may be 90° rotationally symmetric about a stage-z oriented axis located at the stage-x-stage-y center of magnet array assemblies 116A, 116B and/or moveable stages 110A, 110B.

Although their individual magnet arrays 112 may be similar to one another, magnet array assemblies 116A, 116B and moveable stages 110A, 110B of the FIGS. 3A and 3B embodiments have magnet array layouts which are similar to one another in some respects and differ from one another in other respects. In the case of both magnet array assemblies 116A, 116B, a stage-x oriented edge of first magnet array 112A abuts against a stage-x oriented edge of second magnet array 112B (at abutment 155A), a stage-y oriented edge of the first magnet array 112A abuts against a stage-y oriented edge of the fourth magnet array 112D (at abutment 155B), a stage-x oriented edge of third magnet array 112C abuts against a stage-x oriented edge of the fourth magnet array 112D (at abutment 155C), and a stage-y oriented edge of the third magnet array 112C abuts against a stage-y oriented edge of the second magnet array 112B (at abutment 155D). Further, in the case of both magnet array assemblies 116A, 116B, the peripheral edges of magnet arrays 112 are aligned with one another to provide magnet array assemblies 116A, 116B with a generally rectangular peripheral shape (from the top plan view). In particular, the stage-y oriented peripheral edges of first and second magnet arrays 112A, 112B and the stage-y oriented peripheral edges of third and fourth magnet arrays 112C, 112D are aligned with one another in the stage-y direction. Further, the stage-x oriented peripheral edges of the first and fourth magnet arrays 112A, 112D and the stage-x oriented peripheral edges of second and third magnet arrays 112B, 112C are aligned with one another in the stage-x direction.

In some embodiments, these abutments and/or peripheral edge alignments are not necessary and magnet array assemblies 16 may comprise as few as one elongated segment magnet array 12 or a plurality of elongated segment magnet arrays 12 which are spaced apart from one another (i.e. non-abutting), which have non-aligned peripheral edges and/or which abut one another with different abutment and/or alignment relationships. For example, in some embodiments, the stage-y oriented peripheral edges of first and second magnet arrays 112A, 112B and the stage-y oriented peripheral edges of third and fourth magnet arrays 112C, 112D are not aligned with one another in the stage-y direction; and in some embodiments, the stage-x oriented peripheral edges of the first and fourth magnet arrays 112A, 112D and the stage-x oriented peripheral edges of second and third magnet arrays 112B, 112C are not aligned with one another in the stage-x direction.

The layout of magnet array assembly 116B differs from the layout of magnet array assembly 116A in that, for magnet array assembly 116B: corresponding stage-y oriented edges 157A, 157C of first and third magnet arrays 112A, 112C are offset from one another in the stage-x direction (by an offset Ox) and adjacent stage-x oriented edges 159A, 159C of first and third magnet arrays 112A, 112C are spaced apart from one another in the stage-y direction (by a first space Sy); and corresponding stage-x oriented edges 157B, 157D of second and fourth magnet arrays 112B, 112D are offset from one another in the stage-y direction (by an offset Oy) and adjacent stage-y oriented edges 159B, 159D of second and fourth magnet arrays 112B, 112D are spaced apart from one another in the stage-x direction (by a second space Sx). It can be seen from FIG. 3B, that for magnet array assembly 116B, the stage-x dimensions of the first and third magnet arrays 112A, 112C are larger than their corresponding stage-y dimensions, while the stage-y dimensions of the second and fourth magnet arrays 112B, 112D are larger than their corresponding stage-x dimensions. These offsets Ox, Oy and spaces Sx, Sy give rise to a non-magnetized space 151 (with dimensions Sx by Sy) in the center of magnet arrays assembly 116B. In some situations, it can be useful to define the parameters $S_{my}=S_y+O_y$ which is a distance between corresponding stage-x oriented edges of the first and third x-magnet arrays 112A, 112C and $S_{mx}=S_x+O_x$ which is a distance between corresponding stage-y oriented edges of the second and fourth y-magnet arrays 112B, 112D. The layout of magnet array assembly 116B may be advantageous (relative to the layout of magnet array assembly 116A) because active coil traces interacting closely with magnet array 112A may generate relatively little coupling force on the magnet array 112C, and vice versa in magnet array assembly 116B as compared to magnet array assembly 116A; and active coil traces interacting closely with magnet array 112B generate little coupling force on the magnet array 112D, and vice versa in magnet array assembly 116B as compared to magnet array assembly 116A.

The layout of magnet array assembly 116A differs from the layout of magnet array assembly 116B in that, for magnet array assembly 116A: the stage-x oriented edges of the first and second magnet arrays 112A, 112B (i.e. the stage-x oriented edges that provide abutment 155A) have the same stage-x dimension; the stage-y-oriented edges of the first and fourth magnet arrays 112A, 112D (i.e. the stage-y oriented edges that provide abutment 155B) have the same stage-y dimension; the stage-x oriented edges of the third and fourth magnet arrays 112C, 112D (i.e. the stage-x oriented edges that provide abutment 155C) have the same stage-x dimension; and the stage-y-oriented edges of the second and third magnet arrays 112B, 112C (i.e. the stage-y oriented edges that provide abutment 155D) have the same stage-y dimension. Further, with these dimensions (and the above-described abutment and peripheral edge alignment features) magnet array assembly 116A does not have a space that is analogous to space 151 of magnet array assembly 116B. The layout of magnet array assembly 116A may be advantageous (relative to the layout of magnet array 116B) because the magnet array assembly footprint (in the stage-x and stage-y directions) is fully utilized for magnetic field generation.

Another difference between magnet array assemblies 116A, 116B is that for magnet array assembly 116A, the magnet array 112A that is furthest in the positive stage-x direction and furthest in the positive stage-y direction comprises magnetization segments 114A which are elongated in the stage-x direction and the other magnet arrays 112B, 112C, 112D alternate between having magnetization segments 114B, 114C, 114D elongated in the stage-y and stage-x directions. In contrast, for magnet array assembly 116B, the magnet array 112D that is furthest in the positive stage-x direction and furthest in the positive stage-y direction comprises magnetization segments 114D which are elongated in the stage-y direction and the other magnet arrays 112A, 112B, 112C alternate between having magnetization segments 114A, 114B, 114C elongated in the stage-x and stage-y directions. In this description: magnet array assemblies, like magnet array assembly 116A of FIG. 3A, which have a magnet array that is furthest in the positive stage-x direction and furthest in the positive stage-y direction and which comprises magnetization segments which are elongated in the stage-x direction may be referred to as right-handed magnet array assemblies; and magnet array assemblies, like magnet array assembly 116B of FIG. 3B, which have a magnet array that is furthest in the positive stage-x direction and furthest in the positive stage-y direction and which comprises magnetization segments which are elongated in the stage-y direction may be referred to as left-handed magnet array assemblies. It should be understood that many variations to magnet array assemblies 116A, 116B can be used in moveable stages 110A, 110B. In one example, magnet array assembly 116A of FIG. 3A can be changed from a right-handed to a left-handed variation. In another example, magnet array assembly 116B of FIG. 3B can be changed from a left handed to a right handed variation.

Figure 3C:
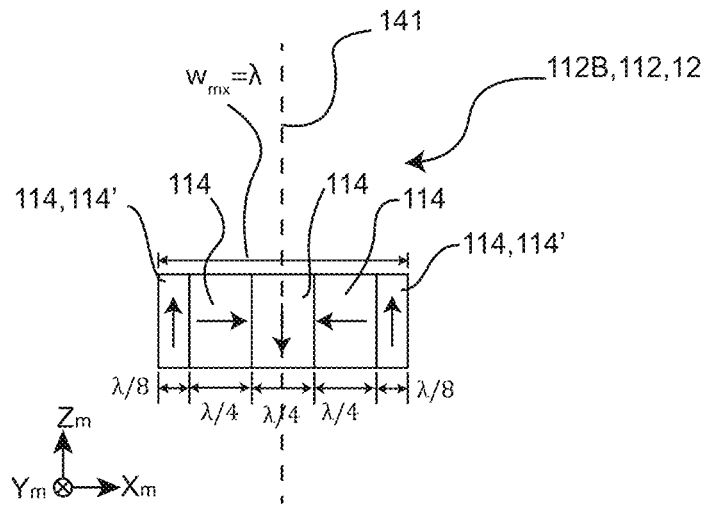
FIG. 3C is a cross-sectional view of an exemplary y-magnet array which is used in the FIG. 3A magnet array assembly and which could be used for the magnet array assemblies of FIG. 3B or any of the other elongated segment magnet array assemblies described herein.

As discussed above, other than for their orientations, the magnet arrays 112 in magnet array assemblies 116A, 116B and moveable stages 110A, 110B may be substantially similar to one another. However, the magnet arrays 112 in magnet array assemblies 116A, 116B may have a wide variety of patterns of magnetization segments 114 (and their corresponding magnetization directions). FIG. 3C is a cross-sectional view of an exemplary y-magnet array 112 (e.g. array 112B) which may be used in the FIG. 3A magnet array assembly 116A and/or in the FIG. 3B magnet array assembly 116B and/or in any of the other elongated segment magnet array assemblies described herein. Various other elongated segment magnet arrays 112 could be used in the FIG. 3A magnet array assembly 116A and/or in the FIG. 3B magnet array assembly 116B and/or in any of the other elongated segment magnet array assemblies described herein. For example, Patent Cooperation Treaty Patent application Nos. PCT/CA2012/050751, PCT/CA2014/050739 and PCT/CA2015/050157 (all of which are hereby incorporated by reference herein) disclose a number of different embodiments of elongated segment magnet arrays, each of which could be used for magnet arrays 112 in any of the elongated magnet array assemblies described herein (e.g. magnet arrays assemblies 116A, 116B).

In the illustrated cross-sectional view of FIG. 3C, magnet array 112 comprises a plurality of magnetization segments 114, each of which has a corresponding magnetization direction (where the magnetization directions of magnetization segments 114 are indicated by arrows). While the magnet array 112 of FIG. 3C is a y-magnet array, it will be appreciated that x-magnet arrays may be provided by merely altering the orientations of the illustrated magnet arrays and that the description of magnet arrays 112 described herein should be understood to apply to y-magnet arrays 112 or x-magnet arrays 112 with adjustment of orientation, as appropriate. As can be seen from FIG. 3C, the stage-x direction width of each magnetic segment 114 is generally equal to one of $$\frac{\lambda_x}{4} \text{ or } \frac{\lambda_x}{8}.$$

In the case of the FIGS. 3A and 3B embodiments, the edge magnetization segments 114' (i.e. magnetization segments 114' at the edges of arrays 112) have stage-x direction widths $$\left(\frac{\lambda_x}{8}\right)$$

that are half of the stage-x direction widths $$\left(\frac{\lambda_x}{4}\right)$$

of the other (interior) magnetization segments 114. In some embodiments, the stage-x direction widths of each magnetic segment 114 may be generally equal to one of $$\frac{\lambda_x}{N} \text{ or } \frac{\lambda_x}{2N},$$

where N is any positive integer. In some embodiments, edge magnetization segments 114' may have stage-x direction widths $$\left(\frac{\lambda_x}{2N}\right)$$

that are half of the stage-x direction widths $$\left(\frac{\lambda_x}{N}\right)$$

of the other (interior) magnetization segments 114. In some embodiments, $N=N_t$ (where $N_t$ represents the number of different magnetization directions in an array 112), as is the case in the illustrated embodiments of FIG. 3C. In the illustrated embodiments of FIG. 3C, the edge magnetization segments 114' have magnetization directions that are oriented in the stage-z direction (in the positive stage-z direction in the case of the illustrated embodiment). For any of the embodiments of magnet arrays 112 shown and/or described herein, the stage-z directions of the magnetization segments 114 may be inverted from those shown and/or described herein.

The various magnet arrays 112 shown in the illustrated embodiments of FIGS. 3A-3C exhibit a number of similar properties. The magnetization directions of magnetization segments 114 are orthogonal to the elongation directions of magnetization segments 114. At least two of magnetization segments 114 of each magnet array 112 are different from one another. In general, magnet arrays 112 may comprise magnetization segments 114 with any suitable integer number $N_t$ ($N_t \geq 2$) of magnetization directions. In the illustrated embodiment of FIG. 3C, $N_t=4$. The magnetization directions of magnetization segments 114 exhibit a spatial period $\lambda_x$ over the stage-x width $W_{mx}$ of magnet arrays 112. To avoid complicating the illustration of FIG. 3C, the spatial period $\lambda_x$ is shown as $\lambda$ without loss of generality. In some embodiments, the spatial period $\lambda_x$ exhibited by the magnetization directions of magnetization segments 114 is the period of a Hallbach array having magnetization segments and magnetization directions similar (e.g. similar widths, magnetization directions and relative spatial order) to those of magnet array 112. In some embodiments, the spatial period $\lambda_x$ exhibited by the magnetization directions of magnetization segments 114 is a spatial period of the magnetization directions of magnetization segments 114 that are present in magnet array 112. In the FIG. 3C embodiment, the stage-x direction width ($W_{mx}$) of magnet array 112 is generally equal to $\lambda_x$, so that the magnetization directions of magnetization segments 114 exhibit a single spatial period $\lambda_x$ over the stage-x direction width $W_{mx}$ of magnet array 112. In some embodiments, the magnetization directions of first magnetization segments 114 may exhibit any positive integer number $N_m$ spatial periods $\lambda_x$ which repeat over the stage-x direction width (($W_{mx}=N_m\lambda_x$) of magnet array 112. In some embodiments, the magnetization directions of magnetization segments 114 exhibit a fraction of one or more spatial periods $\lambda_x$ over the stage-x direction width $W_{mx}$ of magnet array 112. For example, in some embodiments, $W_{mx}=n\lambda_x/2$ or $W_{mx}=n\lambda_2/4$ where n is a positive integer. In the illustrated embodiment of FIG. 3C, the magnetization directions of magnetization segments 114 are mirror symmetric relative to a plane of symmetry (extending in the stage-y and stage z-directions and passing through the stage-x direction center of magnet array 112 indicated by lines 141 shown in FIG. 3C).

Moveable stage 10 of displacement device 50 may comprise optional bumpers (not shown) which may protect moveable stage 10 from other moveable stages and other objects that may be introduced onto stator 30 or into working region 36. Bumpers may be made of non-magnetic materials to protect moveable stage 10 and its magnet array assembly 16. Further bumpers may prevent two or more moveable stages 10 from getting too close to one another (e.g. to a vicinity where their respective magnetization segments 14 might attract one another and might undesirably influence the forces caused by current controllably driven into coil traces 32, 34). Bumpers may also serve to prevent other objects with high magnetic permeability from getting too close to magnet array assembly 16. For example, in the absence of non-magnetic bumpers, an iron or steel washer/screw/nuts dropped onto working region 36 can be attached to magnet array assembly 16 and cause system failure. Examples of suitable bumpers which can be used for any of the moveable stages described herein are described in PCT/CA2015/050157.

In some embodiments, moveable stage 10 may comprise a stage support structure which may be fabricated from highly magnetically permeable material (e.g. with relative magnetic permeability greater than 100), such as iron, ferrite, cobalt, combinations of these materials and/or the like. High magnetic permeability helps enhance the magnetic field below (e.g. in the negative stator-z direction relative to) magnet array assembly 16, which is where the coil traces of stator 30 are typically located during operation. In some embodiments, it may be beneficial to use a stage support structure without back iron. Such embodiments may be desirable to minimize the weight of moveable stage 10, for example. Such stage support structures can be fabricated from aluminum, ceramic, carbon-fiber reinforced composite materials, combinations of these materials and/or the like. Reducing the weight of stage support layer may help to minimize moveable stage inertia.

Stator

Various embodiments and additional detail of stator 30 are now provided. Referring back to FIG. 1 described above, stator 30 comprises a stator coil assembly 35 which comprises at least the traces of a plurality of electrically conductive coils 31. Coils 31 are shaped to provide first and second pluralities of coil traces 32, 34 which are respectively elongated in non-parallel directions. In particular embodiments, such as depicted in FIG. 1A, first plurality of coil traces 32 is orthogonal to second plurality of coil traces 34. In particular embodiments, such as depicted in FIG. 1A, first plurality of coil traces 32 is distributed over at least a portion of a first layer 40 and generally elongated in a stator-x direction; and second plurality of coil traces 34 is distributed over at least a portion of a second layer 42 and generally elongated in a stator-y direction. In some embodiments, such as depicted in FIG. 1A, the first and second layers 40, 42 over which first and second pluralities of coil traces 32, 34 are respectively distributed may be located at different (e.g.

first and second) stator-z locations and layers 40, 42 may overlap one another in the stator-z direction, although this is not necessary. In some embodiments, first and second layers 40, 42 may be provided in different excitation regions (also referred to herein as stator tiles or tiles and described in more detail below), but at the same stator-z location.

In some embodiments, stator 30 may comprise additional pluralities of coil traces (not shown) which may be distributed over portions of additional layers at corresponding additional stator-z direction locations. For example, stator 30 may comprise a first additional plurality of coil traces (not shown) distributed over at least a portion of a first additional layer at a corresponding first additional stator-z location and generally elongated in a stator-x direction; and a second additional plurality of coil traces (not shown) distributed over at least a portion of a second additional layer at a corresponding second additional stator-z location and generally elongated in a stator-y direction. Additional pluralities of coil traces are not limited to being elongated in the stator-x or stator-y directions. In some embodiments, additional pluralities of coil traces are provided which are generally elongated in angular directions between the stator-x and stator-y directions. For example, in some embodiments, stator 30 may comprise one or both of: a first additional angular plurality of coil traces (not shown) distributed over at least a portion of a first additional angular layer at a corresponding first additional angular stator-z location and generally elongated in a direction split between the positive stator-x and positive stator-y directions (e.g. at 45° counter-clockwise around a stator-z axis from the positive stator-x direction in some embodiments); and a second additional angular plurality of coil traces (not shown) distributed over at least a portion of a second additional angular layer at a corresponding second additional angular stator-z location and generally elongated in a direction split between the negative stator-x and positive stator-y directions (e.g. at 45° clockwise around a stator-z axis from the negative stator-x direction in some embodiments). In other embodiments, additional pluralities of coil traces may be elongated at angles α other than 45° from the stator-x and/or stator-y directions. Such coil traces may be referred to herein as α-oriented coil traces or α-traces, where a is their angle as measured from one of the stator-x or stator-y axes.

In some embodiments, coil traces 32, 34 in layers 40, 42 at different stator-z locations may overlap one another in the stator-z direction. The two dimensional space over which coil traces 32, 34 overlap one another in the stator-z direction may define a working region 36 over which moveable stage 10 is moveable relative to stator 30. In some embodiments, coil traces 32, 34 in each corresponding layer 40, 42 may be distributed throughout their respective layers 40, 42, so that coil traces 32, 34 and/or layers 40, 42 may overlap in the stator-z direction at all locations in working region 36. This is not necessary. In some embodiments, coil traces 32, 34 may occupy particular excitation regions (also referred to as stator tiles and described in more detail below) that occupy less than an entirety of a corresponding layer 40, 42. Some of coil traces 32, 34 may be connected at their ends to form a two-phase, three-phase, or multiple-phase winding configuration as described in more detail below. While working region 36 is a two-dimensional space, this description may describe working region 36 as a feature of stator 30, for convenience.

Figure 4:
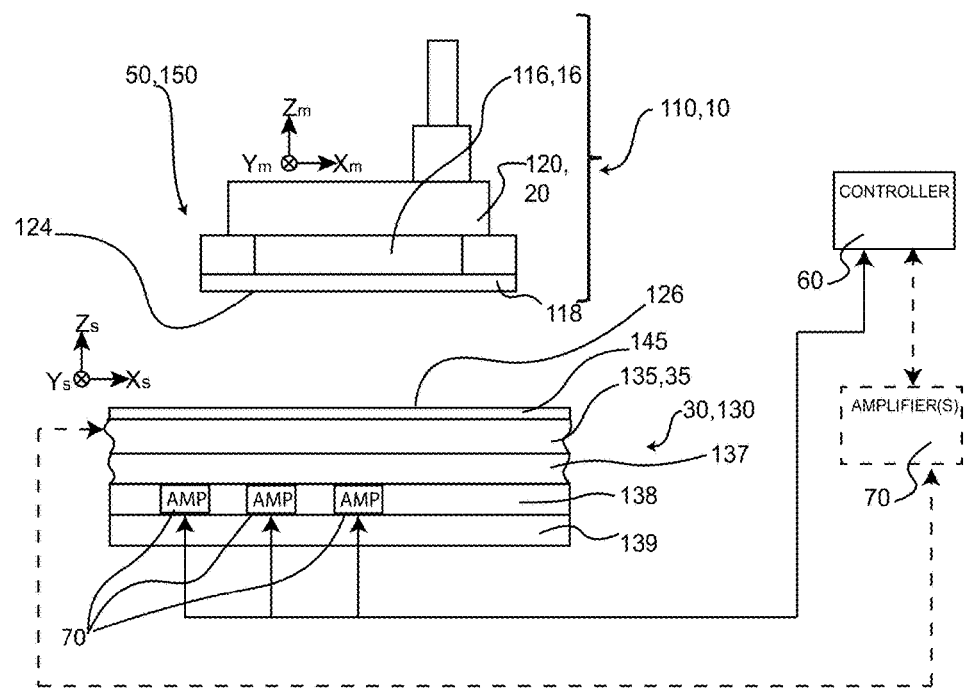
FIG. 4 is a partial schematic side cross-sectional view of a displacement device according to a particular embodiment of the invention.

FIG. 4 shows a displacement device 150 according to a particular embodiment of the invention. FIG. 4 comprises a moveable stage 110 similar to one of those shown in FIGS. 3A-3C and a stator 130. Stator 130 of the FIG. 4 embodiment comprises an optional stator bearing layer 145, stator coil assembly 135, coil supporting layer 137, power electronics layer 138, and optional cooling layer 139. Stator coil assembly 135 may comprise the aforementioned coils 31 and/or coil traces 32, 34.

Optional stator bearing layer 145 may overlap with stator coil assembly 135 in stator-z direction over the stator-x/stator-y span of working region 36 (not shown in FIG. 4). Stator bearing layer 145 may comprise a generally planar stator bearing surface 126 that is generally planar (with a normal parallel to the stator-z direction) and which may bear against (or be separated by an air gap from, but be most proximate to) stage bearing surface 124 that is generally planar (with a normal parallel to the stage-z direction) of stage bearing layer 118 of moveable stage 110. In the illustrated embodiment, stage bearing surface 124 faces the negative stator-z direction and stator bearing surface 126 faces the positive stator-z direction. Various stator bearing layers and restrictor layers are described in Patent Cooperation Treaty application No. PCT/CA2015/050157 and may be used with any of the embodiments of stator 30 (or 130, 230 etc.) as described herein.

Coil supporting layer 137 may provide mechanical support to stator coil assembly 135. Stator coil assembly 135 of the FIG. 3 embodiment may be substantially similar to stator coil assembly 35 of the FIG. 1 embodiment and may comprise coils 31 shaped to provide coil traces 32, 34 (and any additional coil traces) having features similar to those of the FIG. 1 embodiment.

Controller 60 may be connected to deliver control signals to one or more amplifiers 70 and controller 60 may be configured to use those control signals to control the currents driven by amplifier(s) 70 into at least some of coil traces 32, 34 to thereby cause moveable stage 10, 110 to track a desired position within working region 36—e.g. a desired position, $(x_r, y_r)$, within working region 36, where $x_r$ is a desired position of moveable stage 10, 110 in the stator-x direction and $y_r$ is a desired position of moveable stage 10, 110 in the stator-y direction.

In some embodiments, when in operation, moveable stage bearing surface 124 is in close proximity with (e.g. adjacent to) and generally parallel to stator bearing surface 126. In some embodiments, the stator-z direction gap between moveable stage 110 and stator 130 is less than 10 mm, and is typically around 1 mm. This space between stator 130 and moveable stage 110 can be maintained (at least in part) by Z-direction forces created by the interaction of the magnetic fields generated by current in coil traces 32, 34 of stator 130 with magnet arrays 112 of moveable stage 110 as discussed below. In some embodiments, this space (or air gap) between stator 130 and moveable stage 110 can be maintained using additional lifting and/or hoisting magnets, aerostatic bearings, roller bearings and/or the like (not shown), as is known in the art. In some embodiments, as discussed above, the magnetic forces generated by the interaction of currents driven into coil traces 32, 34 and magnet array(s) 112 of moveable stage 110 may be controlled (e.g. by controller 60), such that moveable stage 110 is attracted toward stator 130 whenever the currents are being controllably driven into coil traces 32, 34.

Figure 5:
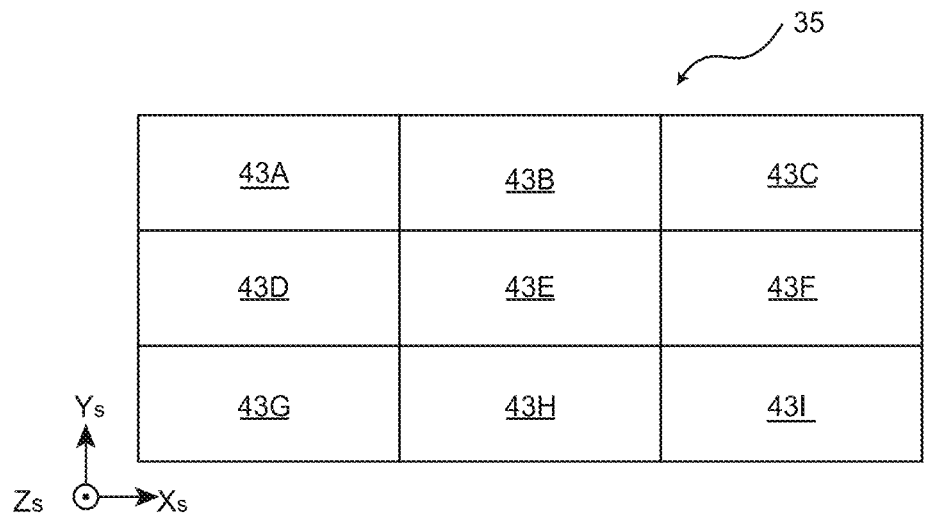
FIG. 5 shows a schematic top view of a stator coil assembly according to a particular embodiment which may be used in any of the displacement devices described herein.

FIG. 5 shows a schematic top view of a stator coil assembly 35 according to a particular embodiment which may be used in displacement device 50 (FIG. 1), displacement device 150 (FIG. 4) or any of the other displacement devices described herein. Stator coil assembly 35, as depicted, comprises a plurality of excitation regions 43A-43I (collectively, excitation regions 43). Excitation regions 43 may also be referred to herein as stator tiles 43 or, for brevity, tiles 43. In some embodiments, each of excitation regions 43 is rectangular in shape. In some embodiments, excitation regions 43 may have other shapes (e.g. triangular, hexagonal and/or the like). Each location in each of excitation regions 43 may overlap corresponding coil trace layers 40, 42 at different stator-z locations and corresponding coil traces 32, 34 (and any additional layers and additional coil traces) in the stator-z direction. Coil traces 32, 34 that overlap a particular one of excitation regions 43 in the stator-z direction may be said to be coil traces 32, 34 in, of, associated with or corresponding to the particular one of excitation regions 43. Each coil trace 32, 34 in each excitation region 43 can be excited with a controllable current, where such current may be controlled by controller 60 which may use control signals to control amplifier(s) 70 which in turn drive current into coil traces 32, 34. Each of excitation regions 43 may be connected to a corresponding amplifier module, which may be located in power electronics layer 138 (see FIG. 4) or may be spatially separated from stator 30 and connected to coil traces 32, 34 in its excitation region 43 using suitable electrical connections. Currents driven into the coil traces 32, 34 in each excitation region 43 can be independently controlled. In some embodiments, two or more excitation regions 43 may share a common amplifier 70 by connecting their corresponding coil traces in parallel or serially. It is not necessary that a particular stator coil assembly 35 comprise a plurality of excitation regions. In some embodiments, it is sufficient for a stator coil assembly 35 to have a single excitation region that spans the entire working region.

Figure 6A:
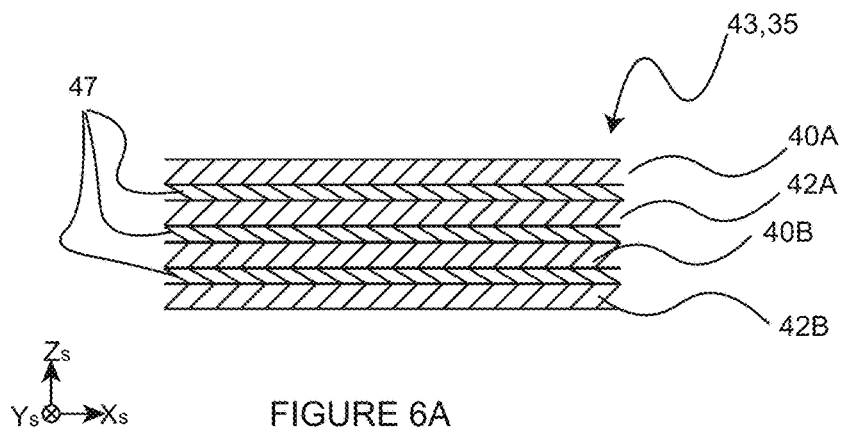
FIGS. 6A-6C each show schematic depictions of portions of coil trace layers and/or coil traces in a corresponding excitation region.
Figure 6B:
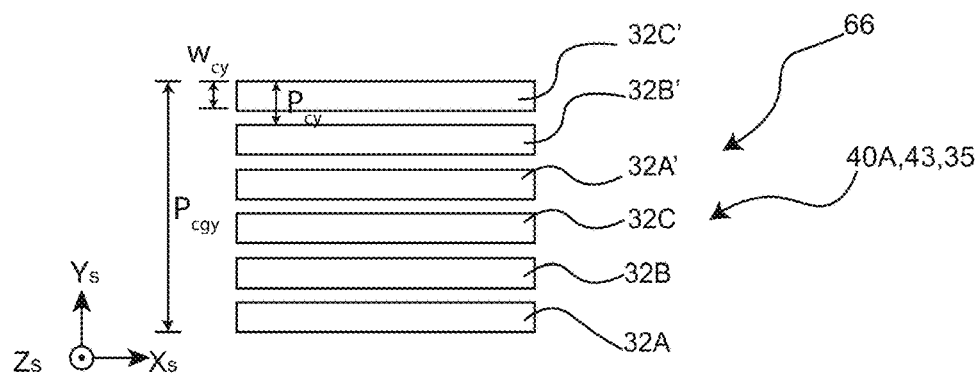
Figure 6C:
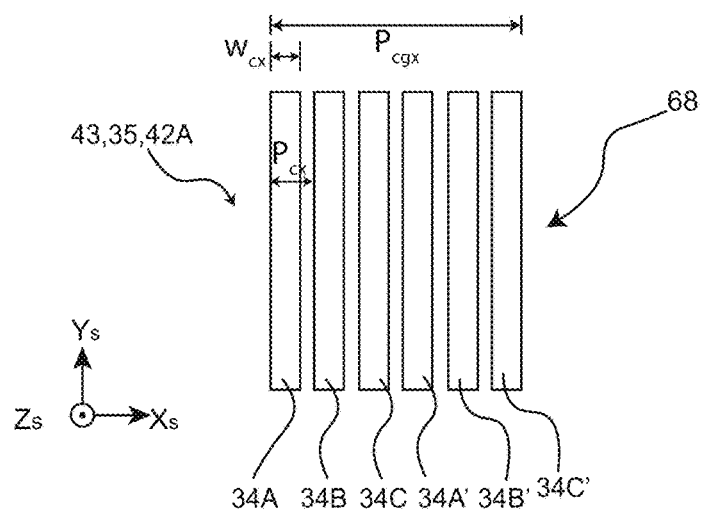

FIGS. 6A-6C each show schematic depictions of portions of coil trace layers 40, 42 and/or coil traces 32, 34 in a corresponding excitation region 43. FIG. 6A is a cross-sectional view (along a stator-x/stator-z plane) of one excitation region 43 of stator coil assembly 35 comprising a plurality of coil trace layers 40A, 40B, 42A, 42B (collectively, coil trace layers, 40, 42). In the FIG. 6A embodiment, each coil trace layer 40, 42 extends in the stator-x and stator-y directions across corresponding excitation region 43, although this is not necessary. In the FIG. 6A embodiment, stator 30 comprises a plurality of x-trace layers 40A, 40B located at different stator-z locations and a plurality of y-trace layers 42A, 42B located at different stator-z locations in one excitation region 43 (although this is not necessary). In the FIG. 6A embodiment, each coil trace layer 40, 42 is separated from adjacent coil trace layers 42, 40 by an insulation layer 47. Insulation layer 47 prevents electrical conduction between coil trace layers 40, 42. Each coil trace layer 40, 42 extends generally in the stator-x and stator-y directions with its normal direction generally parallel to the stator-z direction. As discussed above, each coil trace layer 40, 42 comprises a plurality of coil traces which may be distributed over at least a portion of the layer and which extend in a particular stator direction (e.g. in the stator-x direction or the stator-y direction).

FIG. 6B is a schematic cross-sectional view (along a stator-x/stator-y plane) of a portion of a first coil trace layer 40A according to a particular embodiment. Coil trace layer 40B may have characteristics similar to coil trace layer 40A. The portion of coil trace layer 40A shown in the FIG. 6B embodiment comprises a plurality (referred to herein as a group) 66 of coil traces 32A, 32B, 32C, 32A', 32B', 32C' (collectively, coil traces 32), with each coil trace 32 linearly elongated in the stator-x direction. In some particular embodiments, pluralities of coil traces 32 in a coil trace layer 40 may be organized into coil trace groups 66. Coil traces 32 of one coil trace group 66 may be elongated in the same direction and may be electrically connected together (such as in a star pattern), such that they may be driven by a corresponding multi-phase amplifier as explained in more detail below. Due to their elongation in the stator-x direction, coil traces 32 may be referred to herein as x-traces 32 and group 66 and coil trace layer 40A may be respective referred to as an x-trace group 66 and an x-trace layer 40 or an x-group 66 and an x-layer 40. The x-traces 32 may extend in the stator-x direction across x-trace layer 40 and/or across a corresponding excitation region 43. As shown in FIG. 6B, x-traces 32 may be described as having stator-y direction widths $W_{cy}$ and a stator-y direction pitch $P_{cy}$ between adjacent x-traces 32. In some embodiments, the stator-y direction pitch $P_{cy}$ of adjacent x-traces 32 has a relationship of $\lambda_y = NP_{cy}$, where N is a positive integer number and $\lambda_y = \lambda_1$ is the spatial period of the x-magnet arrays 12, 112. In some particular embodiments, N is the number of x-traces 32 in an x-trace group 66. For example, x-trace group 66 shown in FIG. 6B is made up of N=6 x-traces 32 and $P_{cy} = \lambda_y/N = \lambda_y/6$. The x-trace layer 40 in one excitation region 43 may comprise one or more x-trace groups 66, which may be distributed across x-trace layer 40 and/or a corresponding excitation region 43 in the stator-y direction. As explained in more detail below, in some embodiments, each x-trace group 66 may comprise a plurality of x-coil traces 32 which may be driven (by one or more connected amplifiers 70) with corresponding multi-phase currents so that one phase of the multi-phase currents is driven into each x-coil trace 32 in the x-trace group 66. In some embodiments, the multi-phase currents have a number n of effective phases and the number of x-traces 32 in each x-trace group 66 is 2n, where each x-trace 32 is connected to receive a phase of the multiphase current in one direction or in the opposing direction. As shown in FIG. 6B, x-trace group 66 may be described as having stator-y direction width $P_{cgy}$. In some embodiments, the stator-y direction width $P_{cgy}$ of x-trace groups 66 has a relationship of $P_{cgy} = Q\lambda_y$, where Q is a positive integer number and $\lambda_y = \lambda_1$ is the spatial period of the x-magnet arrays 12, 112.

FIG. 6C is a schematic cross-sectional view (along a stator-x/stator-y plane) of a second coil trace layer 42A according to a particular embodiment. Coil trace layer 42B may have characteristics similar to coil trace layer 42A. Coil trace layer 42A of the FIG. 6C embodiment comprises a plurality (referred to herein as a group) 68 of coil traces 34A, 34B, 34C, 34A', 34B', 34C' (collectively, coil traces 34), with each coil trace 34 linearly elongated in the stator-y direction. In some particular embodiments, pluralities of coil traces 34 in a coil trace layer 42 may be organized into coil trace groups 68. Coil traces 38 of one coil trace group 68 may be elongated in the same direction and may be electrically connected together (such as in a star pattern), such that they may be driven by a corresponding multi-phase amplifier as explained in more detail below. Due to their elongation in the stator-y direction, coil traces 34 may be referred to herein as y-traces 34 and group 68 and coil trace layer 42A may be respective referred to as a y-trace group 68 and a y-trace layer 42 or a y-group 68 and a y-layer 42. The y-traces 34 may extend in the stator-y direction across y-trace layer 42 and/or a corresponding excitation region 43. As shown in FIG. 6C, y-traces 34 may be described as having stator-x direction widths $W_{cx}$ and a stator-x direction pitch $P_{cx}$ between adjacent y-traces 34. In some embodiments, the stator-x direction pitch $P_x$ of adjacent y-traces 34 has a relationship of $\lambda_x = MP_{cx}$, where M is a positive integer number and $\lambda_x = \lambda_2$ is the spatial period of the y-magnet arrays 12, 112. In some particular embodiments, M is the number of y-traces 34 in a y-trace group 68. For example, y-trace group 68 shown in FIG. 6C is made up of M=6 y-traces 34 and $P_x=\lambda_x/M=\lambda_2/6$. The y-trace layer 42 in one excitation region 43 may comprise one or more y-trace groups 68, which may be distributed across y-trace layer 42 and/or a corresponding excitation region 43 in the stator-x direction. As explained in more detail below, in some embodiments, each y-trace group 68 may comprise a plurality of y-coil traces 34 which may be driven (by one or more connected amplifiers 70) with corresponding multiphase currents so that one phase of the multi-phase currents is driven into each y-coil trace 34 in the y-trace group 68. In some embodiments, the multi-phase currents have a number n of effective phases and the number of y-traces 34 in each y-trace group 68 is 2n, where each y-trace 34 is connected to receive a phase of the multiphase current in one direction or in the opposing direction. As shown in FIG. 6C, y-trace group 68 may be described as having stator-x direction width $P_{cgx}$. In some embodiments, the stator-x direction width $P_{cgx}$ of y-trace groups 68 has a relationship of $P_{cgx}=R\lambda_x$, where R is a positive integer number and $\lambda_x=\lambda_2$ is the spatial period of the x-magnet arrays 12, 112.

It will be appreciated that the number of coil traces 32, 34 in groups 66 need not be limited to the exemplary six traces shown in FIGS. 6B, 6C although this number of traces in a group is convenient for using three-phase current as explained in more detail below. In some embodiments, coil trace layers 40, 42 adjacent to one another in the stator-z direction may comprise coil traces that are non-parallel with respect to one another. In some embodiments, coil trace layers 40, 42 adjacent to one another in the stator-z direction may comprise coil traces that are orthogonally oriented with respect to one another. It will be appreciated that the number of coil trace layers 40, 42 in stator 30 need not be limited to the four traces shown in the illustrative embodiment of FIG. 6A. In general, stator 30 may comprise any suitable number of coil trace layers 40, 42. Further, it is not a requirement that the orientations of coil traces in coil trace layers 40, 42 adjacent to one another in the stator-z direction be different from one another. In some embodiment, coil traces may be provided which extend in directions other than the stator-x or stator-y directions. Such traces which may be referred to as α-traces are described in PCT/CA2015/050157.

Further details of stator, coil traces, excitation regions and coil trace layers are described in Patent Cooperation Treaty Patent application Nos. PCT/CA2012/050751, PCT/CA2014/050739 and PCT/CA2015/050157.

Control and Operation

In some embodiments, x-traces 32 in different x-trace layers 40, in different x-trace groups 66 and/or individual x-traces 32 may each be independently driven (by amplifiers 70 under the control of controller 60) with different power amplifier channels. Similarly, in some embodiments, y-traces 34 in different y-trace layers 42, in different y-trace groups 68 and/or individual y-traces 34 may each be independently driven (by amplifiers 70 under the control of controller 60) with different power amplifier channels. While such independent connection provides maximum flexibility of control, this configuration is not necessary in all embodiments or applications. In some embodiments, x-traces 32 in different x-trace layers 40 or in different x-trace groups 66 of one excitation region 43 may be connected serially or in parallel and y-traces 34 in different y-trace layers 42 or in different y-trace groups 68 of one excitation region 43 may be connected serially or in parallel.

Figure 7:
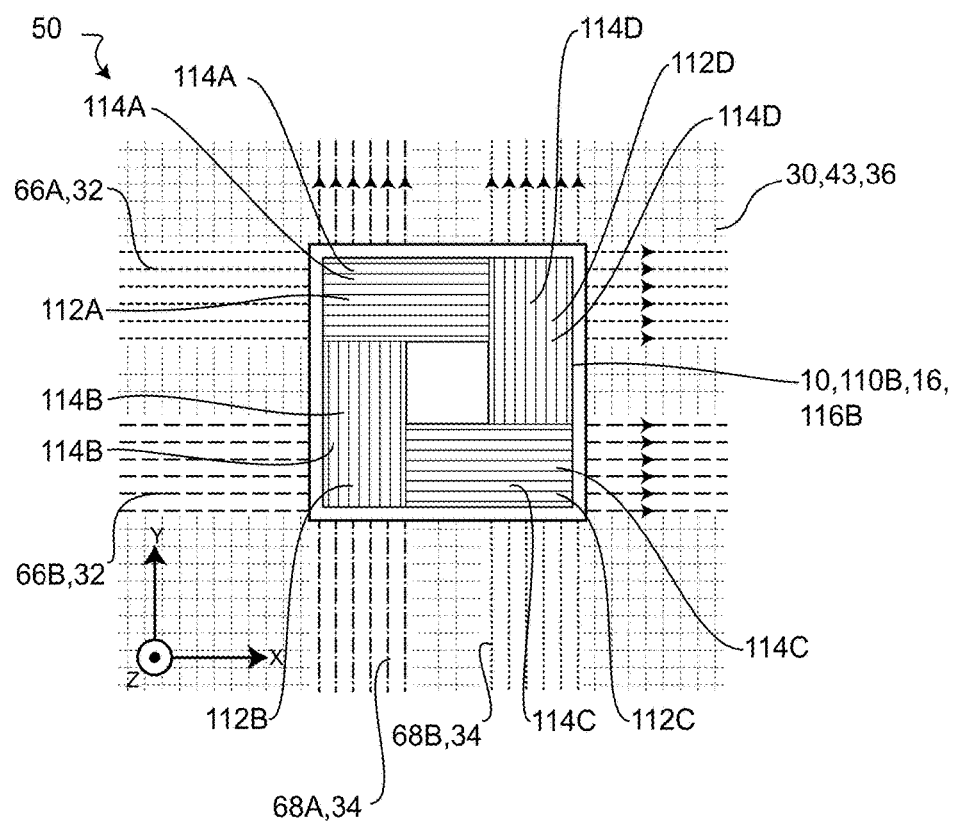
FIG. 7 is a schematic top view of the FIG. 1 displacement device incorporating a moveable stage having the FIG. 3B magnet array assembly according to a particular embodiment.

In general, current driven through the coil traces 32, 34 is used to propel moveable stage 10 to a desired position relative to stator 30 (e.g. in working region 36) and/or to a desired orientation relative to stator 30. Current driven in x-traces 32 may be used to impart force onto (and thereby propel) moveable stage 10 along a stator-y direction to track a desired stator-y position $y_r$; current driven in y-coil traces 34 may be used to impart force onto (and thereby propel) moveable stage 10 along a stator-x direction to track a desired stator-x position $x_r$. Either or both of current driven in x-traces 32 and y-traces 34 may be used to pivot moveable stage 10 around a stator-z oriented axis. Either or both of current driven in x-traces 32 and y-traces 34 may be used to impart force onto (and thereby propel) moveable stage 10 in a stator-z direction. Current driven in x-traces 32 may be used to pivot moveable stage 10 around a stator-x oriented axis; current driven in y-traces 34 may be used to pivot moveable stage 10 around a stator-y oriented axis. The schematic illustration of displacement device 50 shown in FIG. 7 is useful for explaining the particulars of the operation of displacement device 50. The FIG. 7 displacement device 50 comprises a moveable stage 10 and a magnet array assembly 16 which are similar to moveable stage 110 and magnet array assembly 116B shown in FIG. 3B, although the principles of operation are similar for other moveable stages and other magnet array assemblies 16 described herein. A portion of stator 30 (e.g. an excitation region 43 or a portion of an excitation region 43) is shown schematically in FIG. 7 by an intersecting array of lines which represent x-traces 32 and y-traces 34. To facilitate explanation, it is assumed that each x-trace 32 and each y-trace 34 is independently controllable—i.e. that the current driven into such traces 32, 34 is independently controllable. X-traces 32 include two x-trace groups 66A, 66B which are shown with bold lines to indicate that they are active (i.e. that current is being driven into the x-traces 32 of x-trace groups 66A, 66B) and y-traces 34 include two y-trace groups 68A, 68B which are shown with bold lines to indicate that they are active (i.e. that current is being driven into the y-traces 34 of y-trace groups 68A, 68B). The magnetic fields associated with the currents being driven in x-trace groups 66A, 66B interact primarily with x-magnet arrays 112A, 112C respectively; and the magnetic fields associated with the currents being driven in y-trace groups 68A, 68B interact primarily with y-magnet arrays 112B, 112D respectively. More particularly: when x-traces 32 in x-trace group 66A are carrying current, they interact with x-magnet array 112A to impart forces on moveable stage 10 in the y and z directions; when y-traces 34 in y-trace group 68A are carrying current, they interact with y-magnet array 112B to impart forces on moveable stage 10 in the x and z directions; when x-traces 32 in x-trace group 66B are carrying current, they interact with x-magnet array 112C to impart forces on moveable stage 10 in the y and z directions; and when y-traces 34 in y-trace group 68B are carrying current, they interact with y-magnet array 112D to impart forces on moveable stage 10 in the x and Z directions.

It will be appreciated that coil traces 32, 34 shown in FIG. 7 can be selectively activated (e.g. by driving current through the coil traces 32, 34) to impart desired forces on moveable stage 10 and to thereby control the motion (e.g. position) of moveable stage 10 with six degrees of freedom relating to the rigid body motion of moveable stage 10. In some embodiment, each x-trace group 66 and each y-trace group 68 can be selectively activated (e.g. by driving current through the traces corresponding to the coil trace group 66, 68) or deactivated. When a coil trace group 66, 68 is selectively activated, the coil traces corresponding to the coil trace group 66, 68 may be driven with multi-phase currents by one or more multi-phase amplifiers 70. In general, such multi-phase currents can comprise two-phases, three-phases, or any suitable number of phases. When moveable stage 10 is shown in the particular position shown in FIG. 7, coil traces 32, 34 other than those in groups 66A, 66B, 68A, 68B may be inactive. However, it will be appreciated that as moveable stage 10 moves relative to stator 30, different groups of coil traces 32, 34 may be selected to be active and to impart desired forces on moveable stage 10.

It may be observed that the active coil traces 32, 34 in groups 66A, 66B, 68A, 68B appear to interact with other magnet arrays. For example, when carrying current, x-traces 32 in x-trace group 66B interact with x-magnet array 112C as discussed above, but x-traces 32 in x-trace group 66B also pass under a portion of y-magnet array 112B. One might expect that, the currents in x-trace group 66B might interact with the magnets in y-magnet array 112B and impart additional forces on moveable stage 10. However, because of the aforementioned characteristics of y-magnet array 112B, the forces that might have been caused by the interaction of currents in x-trace group 66B and the magnetization segments 114B of y-magnet array 112B cancel one another out, such that these parasitic coupling forces may be eliminated or kept to a minimal level. More particularly, the characteristics of y-magnet array 112B that eliminate or reduce these cross-coupling forces include: y-magnet array 112B comprises magnetization segments 114B which are generally elongated in the stage-y direction with varying magnetizations which are oriented orthogonally to the stage-y direction; the x-dimension width $W_{mx}$ of y-magnet array 112B is $W_{mx}=N_m\lambda_x$ where $N_m$ is an integer and $\lambda_x$ is the magnetic period $\lambda_x$ described above; and y-magnet array 112B is mirror symmetric about a y-z plane 141 that runs through the center of the stage-x dimension of y-magnet array 112B. Similar characteristics of y-magnet array 112D may eliminate or minimize cross-coupling from x-traces 32 in x-trace group 66A. In an analogous manner, the characteristics of x-magnet array 112A may eliminate or reduce cross-coupling forces from y-traces 34 in y-trace group 68A. Such characteristics of x-magnet array 112A include: x-magnet array 112A includes magnetization segments 114A which are generally elongated in the stage-x direction with varying magnetizations which are oriented orthogonally to the stage-x direction; the y-dimension width $W_{my}$ of x-magnet array 112A is $W_{my}=N_m\lambda_y$ where $N_m$ is an integer and $\lambda_y$ is the magnetic period $\lambda_y$ described above; and x-magnet array 112A is mirror symmetric about a x-z plane that is orthogonal to the y-axis and runs through the center of the y-dimension of x-magnet array 112A. Similar characteristics of x-magnet array 112C may eliminate or minimize cross coupling from y-traces 34 in y-trace group 68B.

Further details relating to how currents driven into coil traces 32, 34 impart forces onto moveable stage 10 are described in PCT/CA2012/050751.

Displacement device 50 comprises one or more amplifiers 70 which are connected (e.g. with suitable electrical connections (not expressly shown in FIG. 1)) to drive a plurality of currents into coil traces 32, 34. Amplifiers 70 are controlled by controller 60 which is connected and configured to provide control currents to amplifiers 70. Controller 60 (and components thereof) may comprise hardware, software, firmware or any combination thereof. For example, controller 60 may be implemented on a programmed computer system comprising one or more processors, user input apparatus, displays and/or the like. Controller 60 may be implemented as an embedded system with a suitable user interface comprising one or more processors, user input apparatus, displays and/or the like. Processors may comprise microprocessors, digital signal processors, graphics processors, field programmable gate arrays, and/or the like. Components of controller 60 may be combined or subdivided, and components of controller 60 may comprise sub-components shared with other components of controller 60. Components of controller 60, may be physically remote from one another. Controller 60 may be connected (e.g. with suitable electrical connections (not expressly shown in FIG. 1)) to deliver control signals to amplifiers 70. Controller 60 may be configured (e.g. using suitable software, logic configuration and/or the like) to use those control signals to control the currents driven by amplifiers 70 into at least some of coil traces 32, 34 to thereby cause moveable stage 10 to track a desired position within relative to stator 30 in working region 36—e.g. a desired position, $(x_r,y_r)$, within working region 36, where $x_r$ is a desired position of moveable stage 10 in the stator-x direction and $y_r$ is a desired position of moveable stage 10 in the stator-y direction.

Figure 8A:
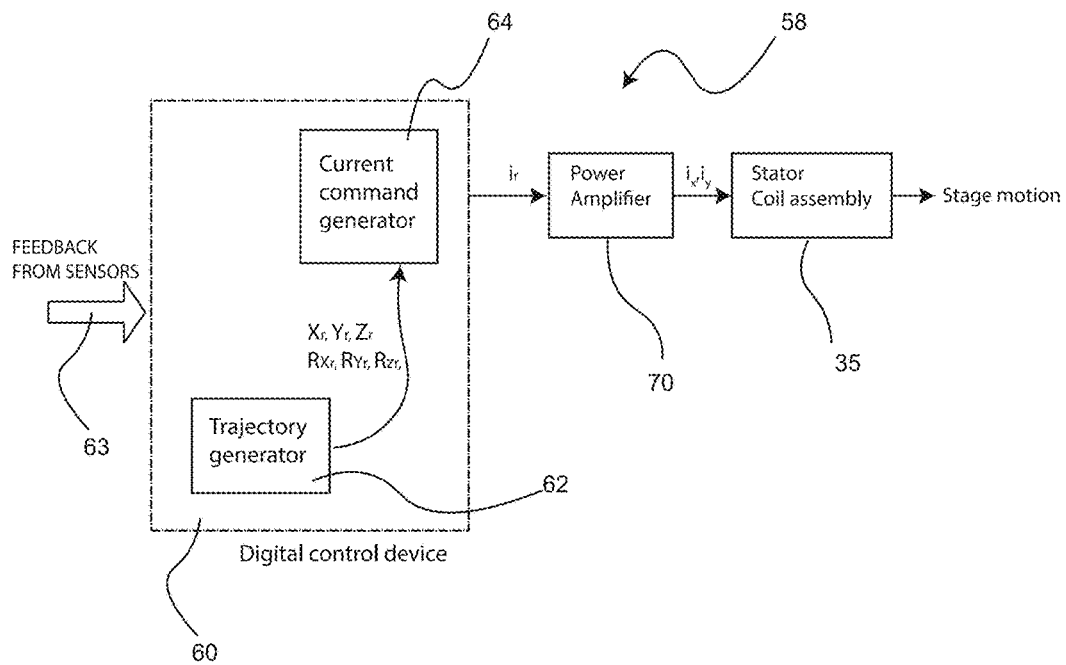
FIGS. 8A and 8B are respectively a schematic block diagram of a control system suitable for use in controlling any of the displacement devices described herein according to a particular embodiment and one possible connection scheme to connect a group of y-traces in one coil trace layer within an excitation region according to a particular embodiment.

FIG. 8A shows a schematic block diagram of a control system 58 suitable for use in controlling any of the displacement devices 50 described herein according to a particular embodiment. Although they may be described as different embodiments, except where otherwise specifically noted, control system 58 and any of the control techniques, embodiments and methods described in the remainder of this description may be used with any of the displacement devices 50 described herein. Control system 58 of the FIG. 8A embodiment comprises controller 60, one or more amplifiers 70 and stator coil assembly 35. Controller 60 may be configured to control (e.g. by providing control signals to) one or more amplifiers 70 (illustrated, in FIG. 8A, as power amplifier 70) to drive currents into the plurality of coil traces in coil trace assembly 35. Such currents can be used by controller 60 to controllably move moveable stage 10 relative to stator 30 via forces associated with the interaction between the magnetic fields generated by currents in the plurality of coil traces and the magnetic fields of the magnet array assembly 16 on moveable stage 10. The currents may be controlled by controller 60 such that these magnetic forces on moveable stage 10 may attract moveable stage 10 toward stator 30 (e.g. in the negative stator-z direction) or may force stage 10 away from stator 30 (e.g. in the positive stator-z direction) at all times when controller 60 is controlling the currents driven by the one or more amplifiers 70.

In the illustrated embodiment, controller 60 is shown as comprising a trajectory generator 62 which generates desired or reference positions for each moveable stage 10. Such reference positions may include any one or more of: a desired or reference stator-x position $x_r$ of moveable stage 10, a desired or reference stator-y position $y_r$ of moveable stage 10, a desired or reference stator-z position $z_r$ of moveable stage, a desired rotational orientations $rz_r$ of moveable stage 10 about a stage-z oriented axis (e.g. a stage-z oriented axis through the stage-x/stage-y center of moveables stage 10 or magnet array assembly 16), a desired rotational orientations $rx_r$ of moveable stage 10 about a stage-x oriented axis (e.g. a stage-x oriented axis through the stage-y/stage-z center of moveables stage 10 or magnet array assembly 16) and a desired rotational orientations $ry_r$ of moveable stage 10 about a stage-y oriented axis (e.g. a stage-y oriented axis through the stage-x/stage-z center of moveables stage 10 or magnet array assembly 16). The reference positions $(x_r,y_r,z_r,rx_r,ry_r,rz_r)$ (or any subset thereof) generated by trajectory generator 62 are typically based on user requirements, application requirements and/or feedback 63 relating to moveable stage(s) 10. By way of non-limiting example, feedback 63 may comprise measured characteristics, such as position, velocity, acceleration and/or orientation of moveable stage(s) 10 which may be obtained from suitable sensors. Feedback 63 can originate from any suitable measurement device(s), system(s) and/or method(s). Some non-limiting examples of suitable measurement device(s), system(s) and/or method(s) are described in Patent Cooperation Treaty application Nos. PCT/CA2012/050751 and PCT/CA2014/050739. For brevity, the remainder of this description will refer to controllably moving moveable stage(s) 10 to reference positions $(x_r, y_r)$ without loss of generality that similar principles could be used to control the motion (e.g. position) of movable stage (10) with the six degrees of freedom corresponding to $(x_r, y_r, z_r, rx_r, ry_r, rz_r)$. In the illustrated embodiment, controller 60 also comprises a current command generator 64. Typically, although not necessarily, the desired position $(x_r, y_r)$ of a moveable stage 10 will vary over time, such that each of the reference positions $x_r, Y_r$ is a function of time and may be described herein as $x_r(t), y_r(t)$ at a particular time, t. The evolutions of the desired positions $(x_r, y_r)$ over time may be referred to as a desired or reference trajectory. Generally, each moveable stage 10 has a unique reference trajectory. For brevity, except where otherwise dictated by the context or the description, this description will focus on the trajectory and corresponding control of one moveable stage 10, it being understood that trajectories and control of other moveable stages 10 may be similarly implemented. Current command generator 64 receives the desired position $(x_r, y_r)$ from trajectory generator 62 and feedback 63 and, based on this information, creates corresponding current control signals $i_r$ using a suitable motion control technique and a suitable current commutation technique. Some examples of suitable motion control and current commutation techniques are described Patent Cooperation Treaty application No. PCT/CA2012/050751. Current command generator 64 provides current control signals $i_r$ to amplifier(s) 70. It will be appreciated that current control signals $i_r$ may comprise a plurality of control signals. In response to these current control signals $i_r$, amplifier(s) 70 drive currents $i_x$, $i_y$ into at least some of the coil traces 32, 34 of stator coil assembly 35. In some embodiments, first currents $i_x$ may represent the currents driven into a first plurality of coil traces (e.g. stator-x oriented coil traces 32) and second currents $i_y$ may represent the currents driven into a second plurality of coil traces (e.g. stator-y oriented coil traces 34). Accordingly, the currents $i_x$ may be referred to herein as x-currents and the currents $i_y$ may be referred to herein as y-currents. As discussed above, stator coil assembly 35 may also comprise α-oriented coil traces and amplifier(s) 70 may additionally or alternatively drive currents is into these traces. However, except where otherwise dictated by the context, discussion of drive currents is omitted for brevity from the description of motion control.

Figure 8B:
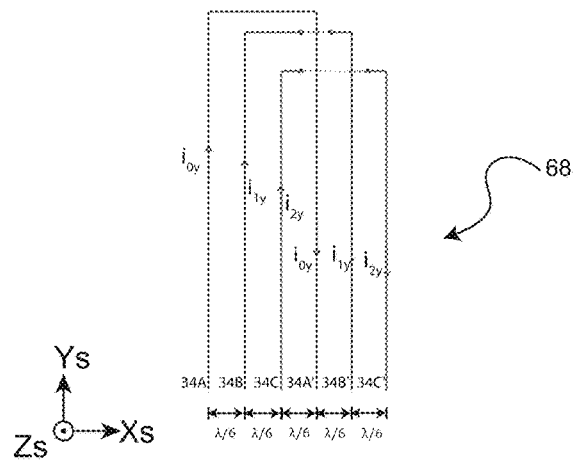

FIG. 8B schematically depicts one possible connection scheme to connect a plurality (e.g. a y-trace group 68) of y-traces 34 in one coil trace layer 42 within an excitation region 43 of stator 30 according to a particular embodiment. It will be appreciated that a plurality (e.g. an x-trace group 66) of x-traces 32 in layer 40 within excitation region 43 of stator 30 may have characteristics analogous to those of y-trace group 66 shown in FIG. 8B. While y-traces 34 shown in FIG. 8B are generally elongated in the stator-y direction, there may be some terminal connections near the edges of one excitation region 43 which connect different y-traces 34 together. Trace terminating connections sometimes extend through one or more other layer(s) (e.g. another layer in the stator-z direction). The illustrated embodiment of FIG. 8B depicts a three-phase effective current embodiment where the y-currents $i_y$ corresponding to the y-traces 34 of y-trace group 68 comprise three different current phases $i_{jy}$ (j=0, 1, 2), each of which flows along a first y-trace 34A, 34B, 34C in a first direction and returns along a second y-trace 34A', 34B', 34C' in an opposite, direction (e.g. current $i_{0y}$ flows in one direction along y-trace 34A and flows in the opposite direction along y-trace 34A'). This current configuration may be achieved by appropriate connection of amplifiers 70 to y-traces 34A, 34B, 34C, 34A', 34B', 34C' in a star configuration.

In the FIG. 8B embodiment, the currents $i_y$ corresponding to the y-traces 34 of y-trace group 68 may be described as comprising three effective current phases, because these currents $i_y$ include three current phases $i_{jy}$ flowing in the first direction and returning in the opposing direction at phases that are 180° out of electrical phase with one another. For example, in FIG. 8B embodiment, the current in trace 34A has the same amplitude as the current in trace 34A', but is flowing in an opposite direction; therefore, the currents in traces 34A, 34A' are not independent and are considered to be one effective current phase. In some embodiments, the currents $i_y$ corresponding to the y-traces 34 of a y-trace group 68 may comprise multi-phase currents comprising a plurality $m_p$ of current phases $i_{jy}$ (j=0, 1, ..., $m_p-1$), where $m_p$ is an integer greater than one. Similarly, the currents $i_x$ corresponding to the x-traces 32 of an x-trace group 66 may comprise multi-phase currents comprising a plurality $n_p$ of current phases $i_{kx}$ (k=0, 1, ..., $n_p-1$), where $n_p$ is an integer greater than one. The currents $i_x$ may be referred to as first currents $i_x$ or x-currents $i_x$ and their corresponding current phases $i_{kx}$ may be referred to as first current phases $i_{kx}$ or x-current phases $i_{kc}$. The currents $i_y$ may be referred to as second currents $i_y$ or y-currents $i_y$ and their corresponding current phases $i_{jy}$ may be referred to as second current phases $i_{jy}$ or y-current phases $i_{jy}$. In some embodiments, the first currents $i_x$ comprise a plurality of first current phases, $i_k$, where k is an integer from 0 to $n_p-1$ representing a first phase index. Such embodiments may be described has having n, effective first current phases $i_k$. Similarly, in some embodiments, the second currents $i_y$ comprise a plurality of second current phases, $i_{jy}$, where j is an integer from 0 to $m_p-1$ representing a second phase index, where $m_p$ is the effective number of second current phases.

To control the position of moveable stage 10 relative to stator 30 in displacement device 50, it may be desirable to obtain feedback 63 which may comprise, for example, measured characteristics, such as position, velocity, acceleration and/or orientation of moveable stage(s) 10 relative to stator 30 or to some other reference. Feedback 63 may be obtained from suitable sensors, measurement systems measurement methods and/or the like. Any suitable sensors, measurement systems measurement methods and/or the like may be used to determine feedback 63. Non-limiting examples of suitable sensors which may be used to provide some or all of feedback 63 include: laser displacement interferometers, two-dimensional optical encoders, laser triangulation sensors, capacitive displacement sensors, eddy current displacement sensors, reflective surfaces suitable for interferometry, accelerometers, Hall-effect sensors and/or the like. Different position sensing techniques can be combined to provide an overall system. Various suitable feedback sensor systems and methods are described in Patent Cooperation Treaty application Nos. PCT/CA2012/050751 and PCT/CA2014/050739.

Figure 9:
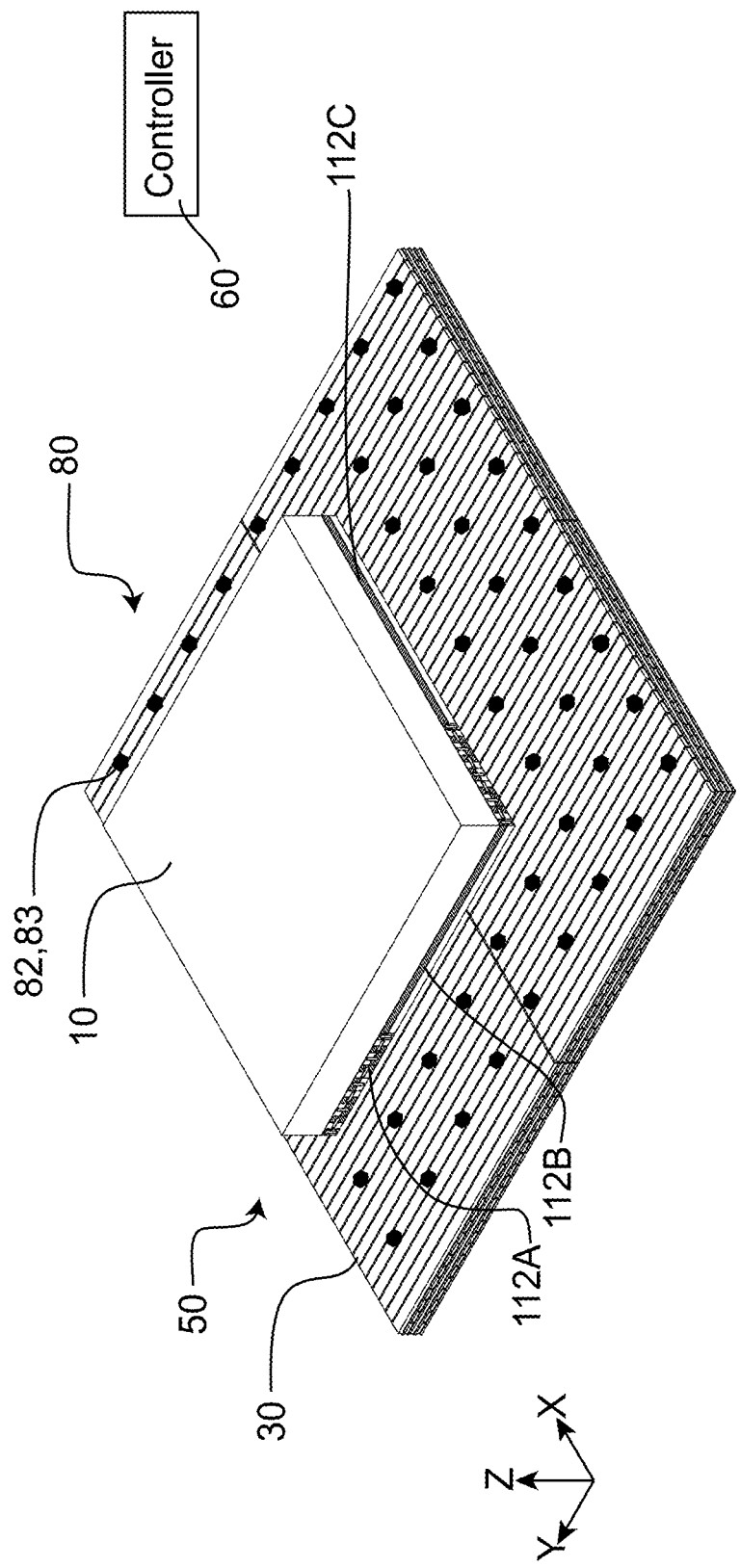
FIG. 9 is a partial schematic isometric view of a displacement device comprising a feedback sensing system according to a particular embodiment of the invention.

FIG. 9 depicts and embodiment of displacement device 50 comprising a feedback sensing system 80 comprising a plurality of magnetic field sensors 82 distributed in an array 83 in a plane extending in the stator-x direction and the stator-y direction with a normal direction in the stator z-direction. Sensors 80 may generate feedback 63 (see FIG. 8A) which may be used by controller 60 to determine or estimate measured characteristics of moveable stage 50. By way of non-limiting example, controller 60 may determine the position, velocity, acceleration and/or orientation of moveable stage 50 relative to stator 30, relative to some reference on or associated with stator 30 and/or relative to some other reference (e.g. some other static reference). In some embodiments, array 83 of sensors 82 is arranged in stator-x oriented sensor rows and stator-y oriented sensor columns, where sensors 82 in a stator-x oriented sensor row are generally aligned with one another in the stator-x direction and sensors 82 in a stator-y oriented sensor column are generally aligned with one another in the stator-y direction. Magnetic field sensors may comprise hall-effect sensors, magneto-resistive sensing elements, magneto-strictive sensing elements and/or any suitable sensor element that is sensitive to magnetic field flux density. Suitable sensing systems 82 incorporating sensor arrays 83 which may be used to generate feedback 63 are described in detail in Patent Cooperation Treaty application No. PCT/CA2014/050739 and may be used with any of the displacement devices described herein.

While the above-described systems operate by controlling the motion of and/or controlling the position of moveable stages in or with multiple (e.g. 6) degrees of freedom, this is not necessary in all embodiments or applications. It will be appreciated from the above, that the number of degrees of freedom in which the motion of moveable stages is controlled using feedback may generally be less than 6 degrees of freedom. For one or more degrees of freedom, controller 60 can operate to drive currents in an open loop configuration (i.e. without feedback 63). In some embodiments, one or more degrees of freedom may be physically constrained (e.g. by mechanical bearings or the like). In some embodiments, controller 60 can operate to drive currents in a completely open loop configuration (i.e. where the number of degrees of freedom in which moveable stage motion is controlled using feedback is zero).

Magnet Arrays with Magnetization Segments Having Non-Axial Magnetization Directions and Magnet Array Assemblies and Moveable Stages Incorporating Same Some embodiments comprise one or more elongated segment magnet arrays wherein one or more individual magnetization segments in the magnet arrays have corresponding magnetization directions which, although orthogonal to the elongation direction of their corresponding magnetization segments, are non-axially oriented—i.e. magnetization segments with magnetization directions that are oriented in directions other than toward the stage-x, stage-y or stage-z direction of their corresponding moveable stage. In some embodiments, such magnet arrays comprise magnetization segments wherein each magnetization segment has a corresponding magnetization direction that is orthogonal to its direction of elongation and is oriented at an angle $\alpha_n$, which is one of $45°+n90°$ where n is any integer (i.e. $\alpha_n$, belongs to the set $\{\alpha_n | \alpha_n = 45°+n90°; n \in \text{Integers}\}$ where an, is an angle about an axis aligned with the direction of elongation of the magnetization segment as measured from the positive stage-z direction of the corresponding moveable stage. In some embodiments, the stage-z direction of the moveable stage may be generally orthogonal to both its stage-x and stage-y directions (e.g. the directions of elongation of the magnetization segments of the corresponding magnetization segments in the x-array(s) and y-array(s)). In some embodiments, the stage-z direction of the moveable stage may be generally orthogonal to the stator-x and stator-y directions (e.g. the directions of elongation of the x-traces and the y-traces). In some embodiments incorporating magnetization segments having these non-axially oriented magnetization directions, the parameter $N_t$ (i.e. the number of different magnetization directions in a magnetization array) is $N_t=4$ (corresponding to the orientations $\alpha_n=\pm 45°$ and $\alpha_n=\pm 135°$). In some embodiments, this parameter is $N_t=1$, $N_t=2$, or $N_t=3$, corresponding to 1, 2 or 3 of the orientations selected from $\alpha_n=\pm 45°$ and $\alpha_n=\pm 135°$. In some embodiments, a magnet array comprises a plurality of magnetization segments which exhibit this property of having corresponding magnetization directions oriented at angles $\alpha_n$, which are each at one of $45°+n90°$ where n is any integer and $\alpha_n$ has the above-discussed interpretation and the magnet array also comprises one or more adjacent pairs of magnetization segments (i.e. adjacent in a direction orthogonal to the direction of elongation of the magnetization segments) where the two magnetization segments in each such pair of adjacent magnetization segments have different magnetization directions. In some embodiments, a magnet array comprises: a first magnetization segment having a corresponding first magnetization direction that is orthogonal to its direction of elongation and is oriented at an angle $\alpha_{n1}$, which is one of $45°+n_1 90°$ where $n_1$ is any integer (i.e. $\alpha_{n1}$ belongs to the set $\{\alpha_{n1}|\alpha_{n1}=45°+n_1 90°; n_1 \in \text{Integers}\}$; and a second magnetization segment adjacent to the first magnetization segment (i.e. adjacent in a direction orthogonal to the direction of elongation of the magnetization segments), the second magnetization segment having a corresponding second magnetization direction that is orthogonal to its direction of elongation and is oriented at an angle $\alpha_{n2}$, which is one of $45°+n_2 90°$ where $n_2$ is any integer that satisfies the conditions: $n_2 \neq n_1$ and $n_2-n_1 \neq 4N$ where N is any integer or $\alpha_{n2}-\alpha_{n1}$ is not an integer multiple of $360°$ (i.e. $\alpha_{n2}$ belongs to the set $\{\alpha_{n2}|\alpha_{n2}=45°+n_2 90°; n_2 \in \text{Integers}; \alpha_{n2}-\alpha_{n1}$ is not an integer multiple of $360°$ $\}$ and $\alpha_n$ has the above-discussed interpretation. In some embodiments, $n_2=n_1+1$. In some embodiments, a magnet array comprises: a plurality of magnetization segments, each having a corresponding magnetization direction that is orthogonal to its direction of elongation and is oriented at an angle $\alpha_n$, which is one of $45°+n90°$ where n is an integer (i.e. $\alpha_n$ belongs to the set $\{\alpha_n|\alpha_n=45°+n90°; n \in \text{Integers}\}$ where $\alpha_n$ has the above-discussed interpretation and wherein n increases by one for each successive adjacent magnetization segment (i.e. adjacent in a direction orthogonal to the direction of elongation of the magnetization segments) in the magnet array. In some embodiments, the magnetization segments in the magnet array may additionally comprise one or more magnetization segments axially oriented magnetization directions (i.e. magnetization directions oriented in the stage-x, stage-y and/or stage-z directions), although this is not necessary. In some embodiments, the magnetization segments in the magnet array comprise one or more magnetization segments having exclusively non-axially oriented magnetization directions (i.e. magnetization directions having orientation angles $\alpha_n$, where $\alpha_n$ is one of $45°+n90°$ where n is any integer (i.e. $\alpha_n$ belongs to the set $\{\alpha_n|\alpha_n=45°+n90°; n \in \text{Integers}\}$). This can be advantageous where it is generally more expensive to manufacture magnet arrays having larger numbers of magnetization segments having different magnetization directions. For example, in PCT/CA2012/050751, to be mirror symmetric about a middle plane, a magnet array with a width of Wm=λ is composed of five magnetization segments with two edge magnetization segments having widths that are half the width of the inner magnetization segments. In comparison, the magnet array shown in FIG. 10B is mirror symmetric and includes only 4 magnetization segments, which may be advantageous in manufacturing, assembly, and dimension control, and may reduce the number of required magnetization segments.

Figure 10A:
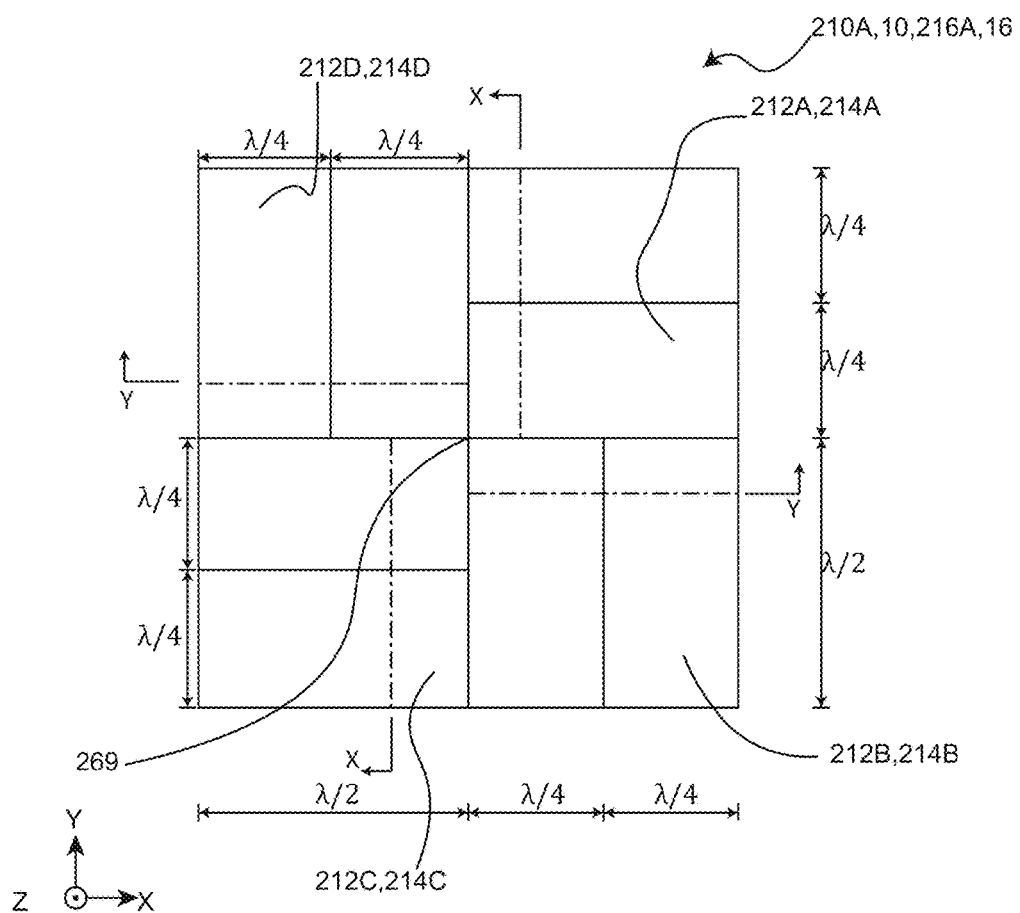
FIGS. 10A, 10C and 10E are schematic top plan views of magnet array assemblies according to particular embodiments
Figure 10B:
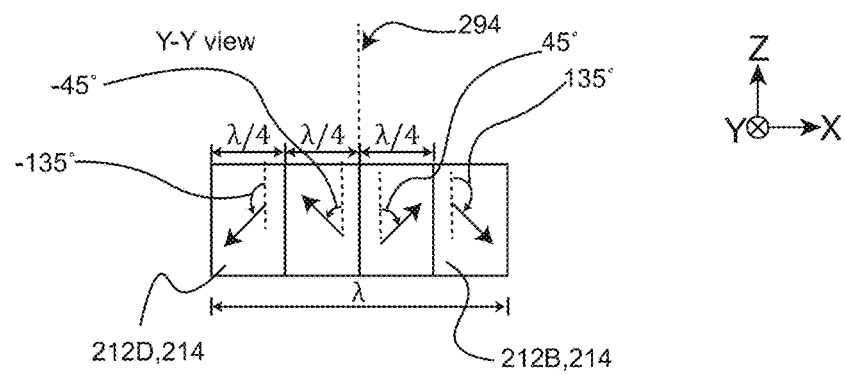
FIGS. 10B, 10D, 10F are respectively, schematic cross-sectional views of magnet arrays which could be used with the magnet array assemblies of FIGS. 10A, 10C and 10E according to particular embodiments.

FIG. 10A is a schematic illustration of a right-handed elongated segment magnetic array assembly 216A which incorporates magnet arrays 212 and magnetization segments 214 having some of these non-axial magnetization direction features according to a particular embodiment. Like some of the other elongated segment magnet array assemblies 16 described herein, magnet array assembly 216A of the FIG. 10A embodiment exhibits 90° rotational symmetry about a centrally (in the stage-x/stage-y direction) located stage-z axis 269. In the FIG. 10A embodiment, each magnet array 212A, 212B, 212C, 212D (referred to generally as magnet arrays 212) has a width $W_{mx}=W_{my}=W_m=\lambda/2$ (see above discussion of the parameters $W_{mx}$, $W_{my}$) and comprises a pair of magnetization segments 214A, 214B, 214C, 214D (referred to generally as magnetization segments 214) each having a width of $\lambda/4$. FIG. 10B is a schematic view of a cross-section of the y-magnet arrays 212B, 212D taken along the two-part split sectional line Y-Y shown in FIG. 10A. As shown in FIG. 10B, y-array 212B comprises a pair of magnetization segments 214 having non-axial magnetization directions oriented at 45° and 135° about the stage-y axis (i.e. its direction of elongation) as measured from the positive stage-z direction and array 212D comprises a pair of magnetization segments 214 having magnetization directions oriented at −45° and −135° about the stage-y axis (i.e. its direction of elongation) as measured from the positive stage-x direction. It can be observed from FIGS. 10A and 10B, that magnet arrays 212B, 212D and their corresponding magnetization segments 214 exhibit a number of the above-described features of magnet arrays having magnetization segments with non-axially oriented magnetization directions. While FIG. 10B shows a cross-sectional view along the split sectional line Y-Y of FIG. 10A, it will be appreciated that x-magnet arrays 212A, 212C could be similarly constructed so that a view taken along the split sectional line X-X of FIG. 10A may look the same as the view shown in FIG. 10B and the description of FIG. 10B should be understood to apply to x-magnet arrays 212A, 212C with adjustment of orientation, as appropriate.

Figure 10C:
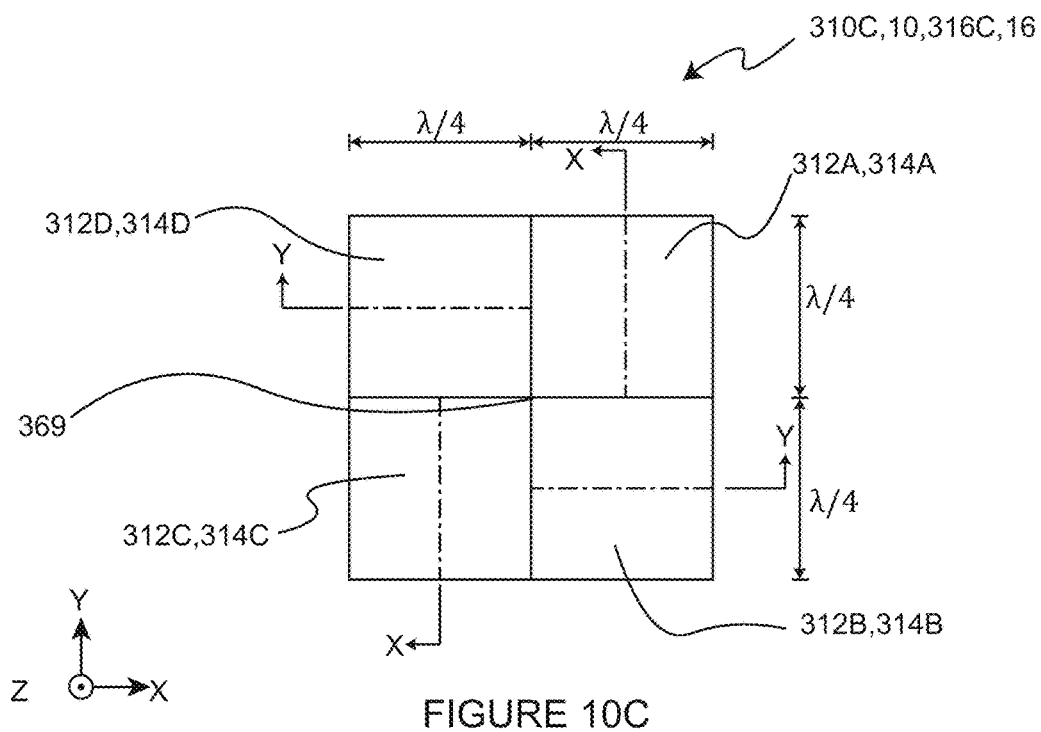
Figure 10D:
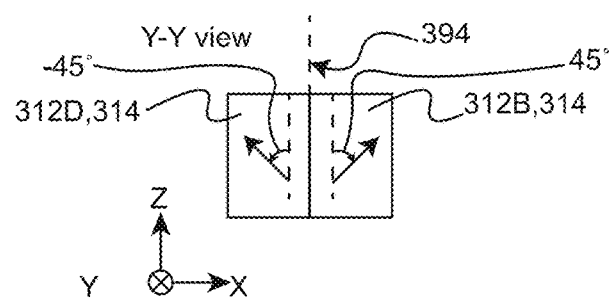

FIG. 10C is a schematic illustration of a right-handed elongated segment magnetic array assembly 316C which incorporates magnet arrays 312 and magnetization segments 314 having some of the above-discussed non-axial magnetization direction features according to another particular embodiment. Like some of the other elongated segment magnet array assemblies 16 described herein, magnet array assembly 316C of the FIG. 10C embodiment exhibits 90° rotational symmetry about a centrally located stage-z axis 369. In the FIG. 10C embodiment, each magnet array 312A, 312B, 312C, 312D (referred to generally as magnet arrays 312) comprises a single magnetization segment 314 with a square footprint in the stage-x-stage-y plane and widths $W_{mx}=W_{my}=W_m=\lambda/4$. FIG. 10D is a schematic view of a cross-section of the y-magnet arrays 312B, 312D taken along the two-part sectional line Y-Y shown in FIG. 10C. As shown in FIG. 10D, array 312B comprises a single magnetization segment 314 having a magnetization direction oriented at 45° about the stage-y axis (its direction of elongation as measured from the positive stage-z direction and array 312D comprises a magnetization segment 314 having a magnetization direction oriented at −45° about the stage-y axis (its direction of elongation) as measured from the positive stage-z direction. It can be observed from FIGS. 10C and 10D, that magnet arrays 312B, 312D and their corresponding magnetization segments 314 exhibit a number of the above-described features of magnet arrays having magnetization segments with non-axially oriented magnetization directions. While FIG. 10D shows a cross-sectional view along the split sectional line Y-Y of FIG. 10C, it will be appreciated that x-magnet arrays 312A, 312C could be similarly constructed so that a view taken along the split sectional line X-X of FIG. 10C may look the same as the view shown in FIG. 10D and the description of FIG. 10D should be understood to apply to x-magnet arrays 312A, 312C with adjustment of orientation, as appropriate. The FIG. 10 magnet arrays assembly 316C is referred to as a right-handed magnet array assembly, even though its most positive stage-x and positive stage-y magnet array (magnet array 312A) is square, because its "elongation direction" may be considered to be the stage-x direction, since the magnetization direction of magnetization segment 314A of magnet array 312A is orthogonal to this stage-x elongation direction. In general, it is another characteristic of right handed magnet array assemblies 16 (like magnet array assembly 316C) that the magnetization direction(s) of the magnetization segment(s) 14 in the furthest positive stage-x and positive stage-y magnet array is/are in the stage-x-z plane and are generally orthogonal to the stage-x axis. For left-handed magnet array assemblies 16, the magnetization direction(s) of the magnetization segment(s) 14 in the furthest positive stage-x and positive stage-y magnet array is/are in the stage-x-z plane and are generally orthogonal to the stage-y axis.

Figure 10E:
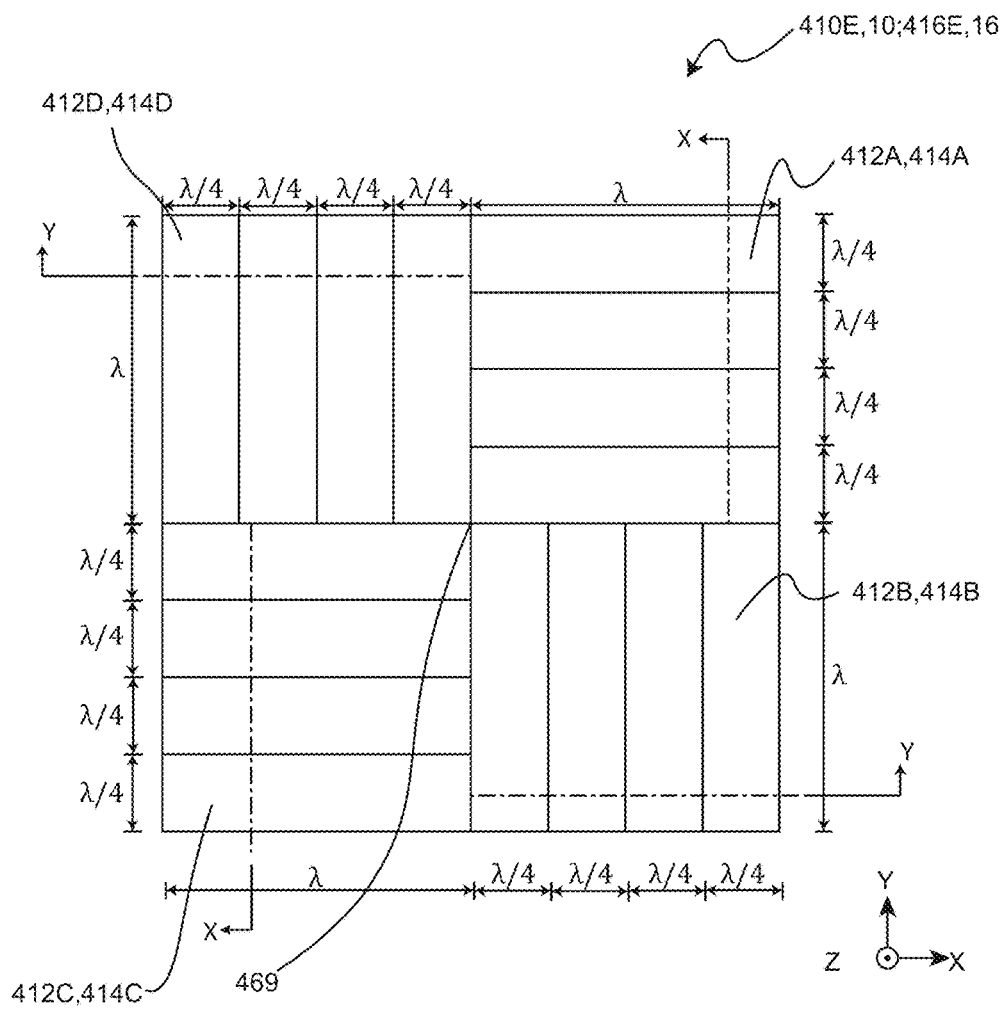
Figure 10F:
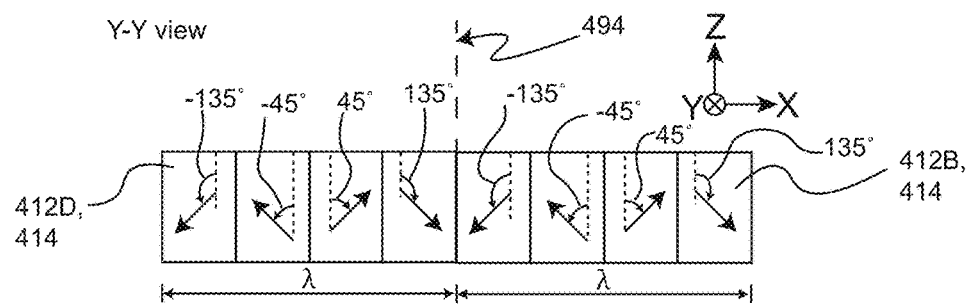

FIG. 10E is a schematic illustration of a right-handed elongated segment magnetic array assembly 416E which incorporates magnet arrays 412 and magnetization segments 414 having some of the above-discussed non-axial magnetization direction features according to another particular embodiment. Like some of the other elongated segment magnet array assemblies 16 described herein, magnet array assembly 416E of the FIG. 10E embodiment exhibits 90° rotational symmetry about a centrally located stage-z axis 469. In the FIG. 10E embodiment, each magnet array 412A, 412B, 412C, 412D (referred to generally as magnet arrays 412) has a width $W_{mx}=W_{my}=W_m=\lambda$ (see above discussion of the parameters $W_{mx}$, $W_{my}$) and comprises four magnetization segments 414A, 414B, 41C, 414D (referred to generally as magnetization segments 414) each having a width of $\lambda/4$. FIG. 10F is a schematic view of a cross-section of the y-magnet arrays 412B, 412D taken along the two-part split sectional line Y-Y shown in FIG. 10E. As shown in FIG. 10F, array 412B comprises four of magnetization segments 414 having magnetization directions oriented at 135°, 45°, −45° and −135° about the stage-y axis (its direction of elongation) as measured from the positive stage-z direction and array 412D comprises four magnetization segments 414 having magnetization directions oriented at 135°, 45°, −45° and −135° about the stage-y axis (its direction of elongation) as measured from the positive stage-z direction. It can be observed from FIGS. 10E and 10F, that magnet arrays 412B, 412D and their corresponding magnetization segments 414 exhibit a number of the above-described features of magnet arrays having magnetization segments with non-axially oriented magnetization directions. While FIG. 10F shows a cross-sectional view along the split sectional line Y-Y of FIG. 10E, it will be appreciated that x-magnet arrays 412A, 412C could be similarly constructed so that a view taken along the split sectional line X-X of FIG. 10E may look the same as the view shown in FIG. 10F and the description of FIG. 10F should be understood to apply to x-magnet arrays 412A, 412C with adjustment of orientation, as appropriate.

Other than for the properties of the non-axial magnetization directions of the various magnetization segments 214, 314, 414 within the magnet arrays 212, 312, 412, magnet array assemblies 216A, 316C, 416E of the embodiments of FIGS. 10A-10F, their components (e.g. magnet arrays and magnetization segments) and their corresponding moveable stages 210A, 310C, 410E may be similar to, have features similar to and/or be suitably modified to have features similar to, any of the other elongated segment magnet array assemblies of any of the other embodiments described herein (e.g. magnet array assemblies 16, 116A, 116B and/or the like), their components (e.g. magnet arrays 12, 112 and magnetization segments 14, 114) and their corresponding moveable stages (e.g. moveable stages 10, 110A, 110B). Similarly, magnet array assemblies 216A, 316C, 416E of the embodiments of FIGS. 10A-10F, their components (e.g. magnet arrays and magnetization segments) and their corresponding moveable stages 210A, 310C, 410E may be similar to, have features similar to and/or be suitably modified to have features similar to, any of the other elongated segment magnet array assemblies described in Patent Cooperation Treaty Patent application Nos. PCT/CA2012/050751, PCT/CA2014/050739 and PCT/CA2015/050157. In particular, the magnetic array assemblies 216A, 316C, 416E of the embodiments of FIGS. 10A-10F may be modified to have magnet array layout features similar to those of any of the other elongated segment magnet array assemblies of any of the other embodiments described herein (e.g. magnet array assemblies 16, 116A, 116B and/or the like). By way of non-limiting example, the magnet array assemblies 216A, 316C, 416E of the embodiments of FIGS. 10A-10F may be modified to provide offsets $O_x$, $O_y$ between corresponding edges of their magnet arrays 212, 312, 412 and spacings $S_x$, $S_y$ between adjacent edges of their magnet arrays 212, 312, 412 which are similar to those of magnet array assembly 110B (FIG. 3B). As another example, the magnet array assemblies 216A, 316C, 416E of the embodiments of FIGS. 10A-10F may be additionally or alternatively modified to have left-handed magnet array configurations like that of magnet array assembly 110B (FIG. 3B). Similarly, magnet arrays 212, 312, 412 and magnetization segments 214, 314, 414 of the embodiments of FIGS. 10A-10F may have features such as array widths ($W_{mx}$, $W_{my}$), magnetization segment widths, and/or the like which are similar to those of magnet arrays 12, 112A, 112B and magnetization segments 14, 114 described herein.

FIGS. 11A-11J show a number of embodiments of magnet arrays 512 which could be used in any of the elongated segment magnet array assemblies described herein (e.g. magnet array assemblies 16, 116A, 116B, 216A, 316C, 416E). For simplicity, magnet arrays 512 shown in FIGS. 11A-11J are all referred to using reference numeral 512, without loss of generality. Magnet arrays 512 shown in FIGS. 11A-11J are all y-magnet arrays 512B, it being appreciated that the description of corresponding x-magnet arrays would be similar with appropriate directional correction. Magnet arrays 512 of the embodiments of FIGS. 11A-11J are all examples of magnet arrays comprising magnetization segments 514 having non-axial magnetization directions and having the corresponding non-axial magnetization direction features according to particular embodiments. More particularly, magnet arrays 512 of FIGS. 11A-11J comprise magnetization segments 514 wherein each magnetization segment 514 has a corresponding magnetization direction that is orthogonal to its direction of elongation and is oriented at an angle $\alpha_n$, which is one of $45°+n90°$ where n is any integer (i.e. $\alpha_n$ belongs to the set $\{\alpha_n | \alpha_n = 45°+n90°; n \in \text{Integers}\}$ where an is an angle about a stage-y axis aligned with the direction of elongation of the magnetization segment as measured from the positive stage-z direction of the corresponding moveable stage. In some embodiments, the stage-z direction of the moveable stage may be generally orthogonal to both its stage-x and stage-y directions (e.g. the directions of elongation of the magnetization segments of the corresponding magnetization segments in the x-array(s) and y-array(s)). In some embodiments, the stage-z direction of the moveable stage may be generally orthogonal to the stator-x and stator-y directions (e.g. the directions of elongation of the x-traces and the y-traces). In some of the FIG. 11A-11J embodiments, the parameter $N_t$ (i.e. the number of different magnetization directions in a magnetization array) is $N_t=4$ (corresponding to the orientations $\alpha_n = \pm 45°$ and $\alpha_n = \pm 135°$)—see FIGS. 11B-11D and 11F-11H. In some embodiments, this parameter is $N_t=1$ (FIG. 11I), $N_t=2$ (FIGS. 11A, 11E) or $N_t=3$ (FIG. 11J), corresponding to 1, 2 or 3 of the orientations selected from $\alpha_n = \pm 45°$ and $\alpha_n = \pm 135°$. In some of the FIGS. 11A-11J embodiments, a magnet array 512 comprises a plurality of magnetization segments 514 which exhibit this property of having corresponding magnetization directions oriented at angles $\alpha_n$, which are each at one of $45°+n90°$ where n is any integer and $\alpha_n$ has the above-discussed interpretation and the magnet array 512 also comprises one or more adjacent pairs of magnetization segments 514 (i.e. adjacent in a direction orthogonal to the direction of elongation of the magnetization segments) where the two magnetization segments 514 in each such pair of adjacent magnetization segments 514 have different magnetization directions. In some of the FIG. 11A-11J embodiments, a magnet array 512 comprises: a first magnetization segment 514 having a corresponding first magnetization direction that is orthogonal to its direction of elongation and is oriented at an angle $\alpha_{n1}$, which is one of $45°+n_1 90°$ where $n_1$ is any integer (i.e. $\alpha_{n1}$ belongs to the set $\{\alpha_{n1} | \alpha_{n1} = 45°+n_1 90°; n_1 \in \text{Integers}\}$; and a second magnetization segment adjacent to the first magnetization segment (i.e. adjacent in a direction orthogonal to the direction of elongation of the magnetization segments), the second magnetization segment having a corresponding second magnetization direction that is orthogonal to its direction of elongation and is oriented at an angle $\alpha_{n2}$, which is one of $45°+n_2 90°$ where $n_2$ is any integer that satisfies the conditions: $n_2 \neq n_1$ and $n_2 - n_1 \neq 4N$ where N is any integer or $\alpha_{n2} - \alpha_{n1}$ is not an integer multiple of $360°$ (i.e. $\alpha_{n2}$ belongs to the set $\{\alpha_{n2} | \alpha_{n2} = 45°+n_2 90°; n_2 \in \text{Integers}; \alpha_{n2} - \alpha_{n1}$ is not an integer multiple of $360°$ $\}$ and $\alpha_n$ has the above-discussed interpretation. In some embodiments, $n_2 = n_1 + 1$. In some of the FIG. 11A-11J embodiments, a magnet array 512 comprises: a plurality of magnetization segments 514, each having a corresponding magnetization direction that is orthogonal to its direction of elongation and is oriented at an angle $\alpha_n$, which is one of $45°+n90°$ where n is an integer (i.e. an belongs to the set $\{\alpha_n | \alpha_n = 45°+n90°; n \in \text{Integers}\}$ where $\alpha_n$ has the above-discussed interpretation and wherein n increases by one for each successive adjacent magnetization segment 514 (i.e. adjacent in a direction orthogonal to the direction of elongation of the magnetization segments) in the magnet array 512. In some of the FIG. 11A-11j embodiments, the magnetization segments 514 in the magnet array 512 may additionally comprise one or more magnetization segments axially oriented magnetization directions (i.e. magnetization directions oriented in the stage-x, stage-y and/or stage-z directions), although this is not necessary. In some of the FIG. 11A-11J embodiments, the magnetization segments in the magnet array comprise one or more magnetization segments having exclusively non-axially oriented magnetization directions (i.e. magnetization directions having orientation angles $\alpha_n$, where $\alpha_n$ is one of $45°+n90°$ where n is any integer (i.e. $\alpha_n$ belongs to the set $\{\alpha_n|\alpha_n=45°+n90°; n\in\text{Integers}\}$). This can be advantageous where it is generally more expensive to manufacture magnet arrays having larger numbers of magnetization segments having different magnetization directions. For example, in PCT/CA2012/050751, to be mirror symmetric about a middle plane, a magnet array with a width of Wm=$\lambda$ is composed of five magnetization segments with two edge magnetization segments having widths that are half the width of the inner magnetization segments. In comparison, the magnet array shown in FIG. 10B is mirror symmetric with Wm=$\lambda$ and includes only 4 magnetization segments, which may be advantageous in manufacturing, assembly, and dimension control, and may reduce the number of required magnetization segments.

Magnet arrays 512 of FIGS. 11A-11H have stage-x widths W, given generally by $$W_{mx} = \frac{N_m \lambda_x}{2}$$

Figure 11A:
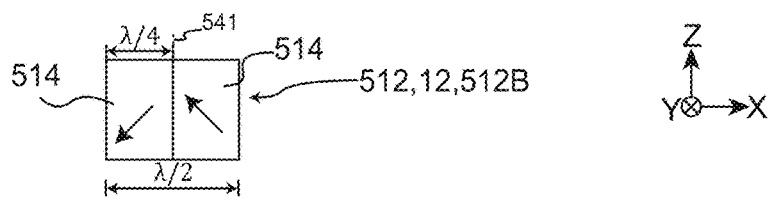
FIGS. 11A-11J schematically depict cross-sectional views of a number of magnet arrays which could be used in any of the elongated segment magnet array assemblies described herein according to particular embodiments.
Figure 11B:
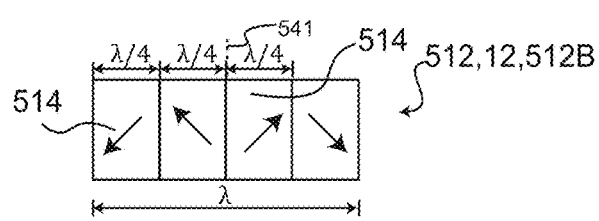
Figure 11C:
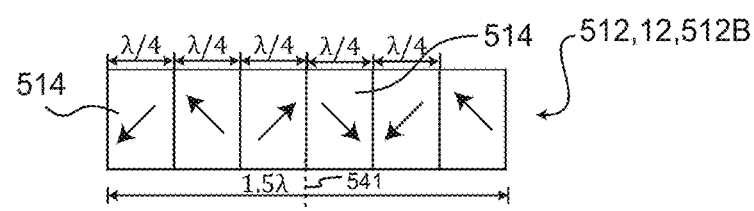
Figure 11D:
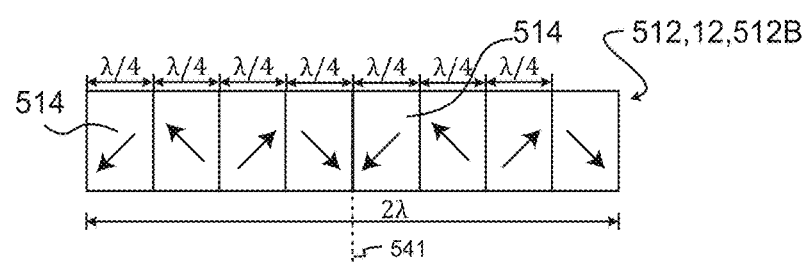
Figure 11E:
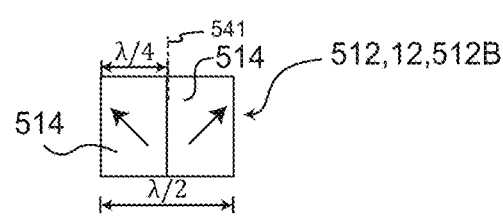
Figure 11F:
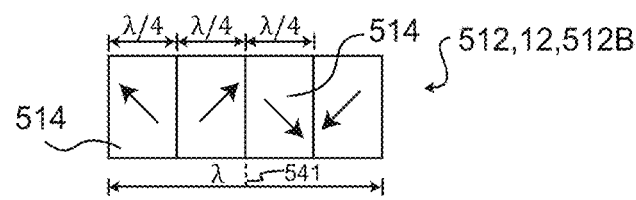
Figure 11G:
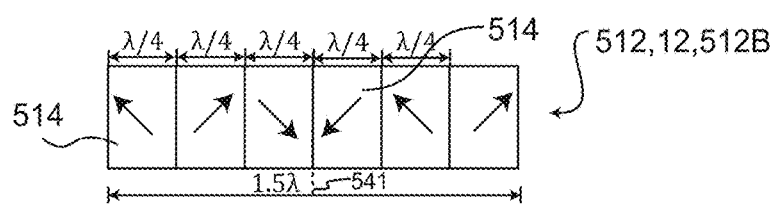
Figure 11H:
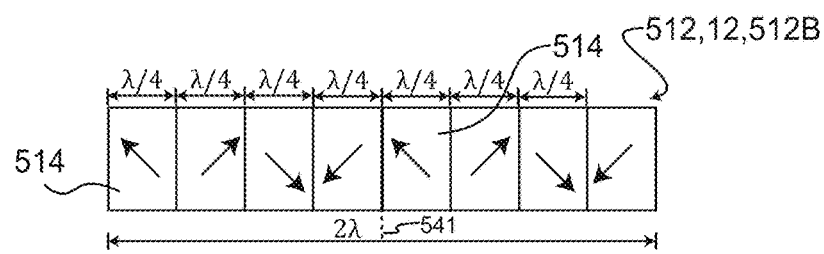

(where $N_m$ is a positive integer and $\lambda_x$ is the above-discussed spatial period). It can be observed that: $N_m=1$ for the embodiments of FIGS. 11A, 11E; $N_m=2$ for the embodiments of FIGS. 11B, 11F; $N_m=3$ for the embodiments of FIGS. 11C, 11G; and $N_m=4$ for the embodiments of FIGS. 11D, 11H. Magnet arrays 512 of FIGS. 11B, 11D, 11G are mirror symmetric about plane 541 which extends in the stage-y and stage-z directions. In the magnet arrays 512 of the embodiments of FIGS. 11A-11J, the individual magnetization segments 514 have stage-x dimension widths of $$\frac{\lambda_x}{4}.$$

Any of the magnet arrays 512 in the embodiments of the FIGS. 11A-11J can be used to create a magnet array assembly having 90° rotational symmetry (about a central stage-z axis) using the pattern of arrays 112 shown in array assemblies 116 of FIGS. 3A and 3B. For example, the magnet arrays 512 in any of FIGS. 11A-11J can be used to provide one of the x-arrays (e.g. array 112A) and one of the y-arrays (e.g. array 112B) in the magnet arrays assemblies 116 of FIGS. 3A, 3B. If the width $W_m$ of the array 512 of FIGS. 11A-11J is an integral multiple of $\lambda$, then the identical arrays 512 can be used to provide the other one of the x-arrays (e.g. array 112C) and the other one of the y-arrays (e.g. array 112D) in the magnet arrays assemblies 116 of FIGS. 3A, 3B. If, on the other hand, the width $W_m$ of the array 512 of FIGS. 11A-11J is an odd integer multiple of $\lambda/2$, then the magnetization directions of the individual magnetization segments of the arrays 512 of FIGS. 11A-11J can be reversed on a segment by segment basis prior to using the inverted arrays to provide the other one of the x-arrays (e.g. array 112C) and the other one of the y-arrays (e.g. array 112D) in the magnet arrays assemblies 116 of FIGS. 3A, 3B.

Figure 11I:
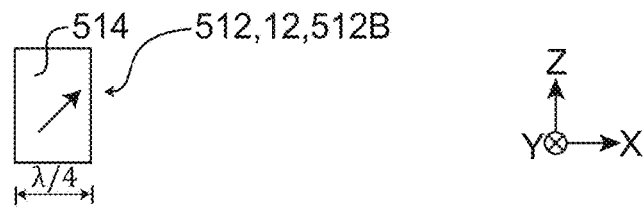
Figure 11J:
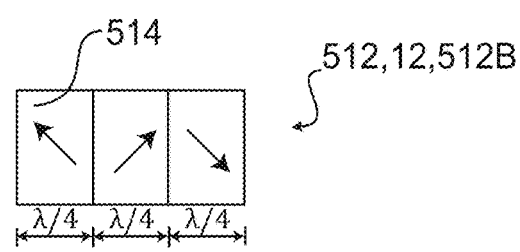

Magnet array 512 of FIG. 11I has a stage-x width $$W_{mx} = \frac{\lambda_x}{4}$$

and magnet array 512 of FIG. 11J has a stage-x width $$W_{mx} = \frac{3\lambda_x}{4}$$

where $\lambda_x$ is the above-discussed spatial period. In the FIG. 11I embodiment, array 512 comprises a single magnetization segment 514 which has a magnetization direction oriented at 45° about the stage-y elongation axis as measured from the positive stage-z direction. In the FIG. 11J embodiment, array 512 comprises three magnetization segments 514 which have magnetization directions oriented at ±45° and 135 about the stage-y elongation axis as measured from the positive stage-z direction. Some characteristics of the magnet arrays 512 of the embodiments of FIGS. 11A-11H which make them suitable for use in magnetic planar motion stages 10 according to some embodiments include without limitation: (i) each stage-y elongated magnetization segment 514 has an stage-x dimension width of $\lambda_x/4$; (ii) the total stage-x direction widths of these magnet arrays 512 are $W_{mx}=N_m\lambda_x/4$ (where $N_m$ is a positive integer and $\lambda_x$ is the spatial period); and (iii) these magnet arrays 512 exhibit some of the above-discussed non-axial magnetization direction properties.

FIGS. 12A-12H schematically depict cross-sectional views of a number of magnet arrays 612 which could be used in any of the elongated segment magnet array assemblies described herein according to particular embodiments. Magnet arrays 612 of FIGS. 12A-12H are respectively similar to magnet arrays 512 of FIGS. 11A-11H and exhibit similar properties to magnet arrays 512 of FIGS. 11A-11H, except that each of magnet arrays 612 of FIGS. 12A-12H respectively comprises a pair of sub-arrays 612A, 612B that are similar to the corresponding magnet arrays 512 of FIGS. 11A-11H and the two sub-arrays 612A, 612B are separated by a non-magnetic spacer 636 centrally located in their stage-x dimensions. In the case of the embodiments shown in FIGS. 12A-12H, the left sub-array 612A (in the view of FIGS. 12A-12H) is identical to the corresponding array 512 of the embodiments of FIGS. 11A-11H and the right sub-array 612B (in the view of FIGS. 12A-12H) continues the magnetization pattern of rotation of left sub-array 612A about the direction of elongation (i.e. about the stage-y-axis in FIGS. 12A-12H). For example, FIGS. 12A-12H show that, for the left sub-array 612A, each successive magnetization segment 614 (moving from left to right in the illustrated views) has a magnetization direction that is rotated about the elongation direction by 90° clockwise relative to the preceding magnetization segment 614. In the illustrated embodiments, the rotation pattern of left sub-array 612A (e.g. 90° clockwise rotation pattern in the illustrated embodiment) continues across non-magnetic spacer 636 into the right sub-array 612B. In particular, in the case of the illustrated embodiments of FIGS. 12A-12H: the left-most magnetization segment 614 of sub-array 612B (immediately adjacent to non-magnetic spacer 636) is rotated by 90° clockwise from the right-most magnetization segment of sub-array 612A (immediately adjacent to non-magnetic spacer 636); and each successive magnetization segment 614 of right sub-array 612B (moving from left to right in the illustrated views) has a magnetization direction that is rotated about the elongation direction by 90° clockwise relative to the preceding magnetization segment. As another way of describing this relationship, it can be seen from FIGS. 12A-12H, that in the illustrated embodiments, where the stage-x direction widths $W_{side}$ of the sub-arrays 612A, 612B are an integer multiple of $\lambda_x$ (shown as $\lambda_x=\lambda_y=\lambda$ in FIGS. 12A-12H), then the two sub-arrays 612A, 612B are identical, except for the spatial locations of their magnetization segments; and that where the stage-x direction widths $W_{side}$ of the sub-arrays 612A, 612B are an odd integer multiple of $\lambda_x/2$ (shown as $\lambda_x=\lambda_y=\lambda$ in FIGS. 12A-12H), then the corresponding magnetization segments 514 (left to right) of the two sub-arrays 612A, 612B have their magnetization directions reversed from one another on a segment by segment basis. Spacers 636 (of y-magnet arrays 612 shown in FIGS. 12A-12H) may be provided with stage-x widths g which may be at least approximately equal to $$g = \left(\frac{N_g}{5} + \frac{1}{10}\right)\lambda_2,$$

where $N_g$ is a non-negative integer number and $\lambda_2$ is the spatial period (shown as $\lambda$ in FIGS. 12A-12H). When the stage-x width g of spacers 636 exhibits this property, spacers 636 will have an attenuating (cancelling) effect on disturbance torques and/or forces created by the $5^{th}$ order harmonic field of magnet array 612. In general, the stage-x width g of the non-magnetic spacer 636 may be set to be at least approximately equal to $$= \left(\frac{N_g}{k} + \frac{1}{2k}\right)\lambda_2,$$

where $N_g$ and $\lambda_2$ are as described above and k is the order of the harmonic of the magnetic field to be attenuated. In some embodiments, spacers 636 (of the y-magnet arrays 612 shown in FIGS. 12A-12H) may be provided with a stage-x width g which is at least approximately equal to $$g = \frac{K_g}{5}\lambda_2 - W_{cx},$$

where $K_g$ is a non-negative integer number and $W_{cx}$ is the stator-x width of coil traces 34 generally elongated in stator-y direction. When the stage-x width g of spacers 636 exhibits this property, spacers 636 will have an attenuating (cancelling) effect on disturbance torques and/or forces created by the $5^{th}$ order harmonic field of magnet array 612. In general, the stage-x width g of the non-magnetic spacer 636 may be set to be at least approximately equal to $$= \frac{K_g}{k}\lambda_2 - W_{cx},$$

where $K_g$ and $W_{cx}$ have the above described properties and k is the order of the harmonic of the magnetic field to be attenuated.

The magnet array 612 embodiments shown in FIGS. 12A-12H have two sub-arrays 612A, 612B arranged on either stage-x side of non-magnetic spacer 636. Both the left and right sub-arrays 612A, 612B (in the illustrated view) of the FIGS. 12A-12H magnet arrays 612 have magnetization patterns similar to those of magnet arrays 612 of FIGS. 11A-11H. The stage-x direction width $W_{side}$ of each sub-array 612A, 612B of the magnet arrays 612 of FIGS. 12A-12H (i.e. the stage-x direction distance between an edge of array 612 and the edge of non-magnetic spacer 636) has a dimension that is the same as the corresponding width $W_{mx}$ of the corresponding one of arrays 512 of FIGS. 11A-11H and the total stage-x direction width of the magnet arrays 612 of FIGS. 12A-12H is $W_m=2W_{side}+g$. It can be seen from FIGS. 12A-12H, that in the illustrated embodiments, where the stage-x direction widths $W_{side}$ of the sub-arrays 612A, 612B are an integer multiple of $\lambda_x$ (shown as $\lambda_x=\lambda_y=\lambda$ in FIGS. 12A-12H), then the two sub-arrays 612A, 612B are identical, except for the spatial locations of their magnetization segments; and that where the stage-x direction widths $W_{side}$ of the sub-arrays 612A, 612B are an odd integer multiple of $\lambda_x/2$ (shown as $\lambda_x=\lambda_y=\lambda$ in FIGS. 12A-12H), then the corresponding magnetization segments 514 (left to right) of the two sub-arrays 612A, 612B have their magnetization directions reversed from one another on a segment by segment basis.

Magnet Array Spacing

Figure 13A:
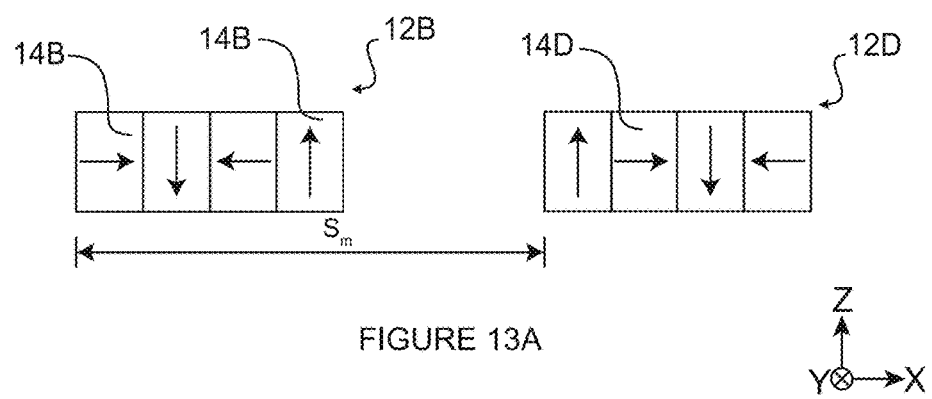
FIGS. 13A and 13B depict schematic cross-sectional views of pairs of parallel adjacent magnet arrays according to particular embodiments suitable for use with the FIG. 3B magnet array assembly and showing the magnetization directions of their corresponding magnetization segments.
Figure 13B:
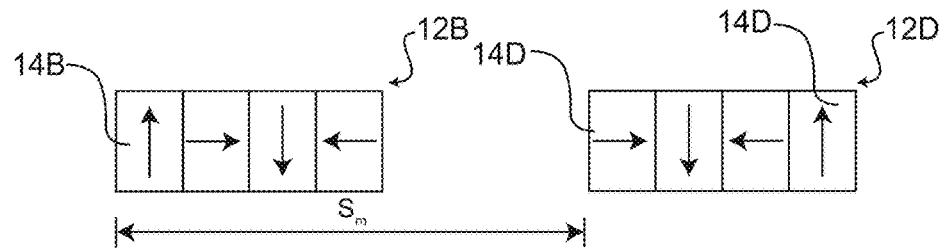

In some embodiments, two adjacent parallel magnet arrays 12 (e.g. a pair of x-magnet arrays 12, such as x-magnet array 112A and x-magnet array 112C in the case of the FIG. 3B embodiment and/or a pair of y-magnet arrays 12, such as y-magnet array 112B and Y-magnet array 112D, in the case of the FIG. 3B embodiment) may comprise magnetization segments 14 with magnetization orientations that are the same as one another. In some embodiments, two adjacent parallel magnet arrays 12 may comprise magnetization segments 14 with magnetization orientations that are the opposites of one another—i.e. as if each magnetization segment 14 is individually rotated 180° about a corresponding axis along which it is linearly elongated. In some embodiments, two adjacent parallel magnet arrays 12 may comprise magnetization segments 14 with magnetization orientations that are mirror symmetric to each other about a middle plane passing through the center of the space therebetween and extending in the elongation direction and stage-z direction. This characteristic is shown, for example, in FIGS. 13A and 13B, where exemplary y-magnet array 12B and y-magnet array 12D comprise magnetization segments 14B, 14D with magnetization orientations which are mirror symmetric about a plane that goes through the stage-x dimension center of the space between them and extends in stage-y and stage-z directions.

In some embodiments, the above-discussed spacing parameter $S_{mx}=O_x+S_x$ and/or the spacing parameter $S_{my}=O_y+S_y$ (which may be equal to one another (i.e. $S_{mx}=S_{my}=S_m$)) are is designed to be at least approximately $$S_m = N_S\frac{\lambda}{2} + \frac{\lambda}{4},$$

where $N_S$ is a positive odd integer and $\lambda=\lambda_1=\lambda_2$ is the above-discussed spatial period. Where the spacing of adjacent parallel magnet arrays 12 which are mirror symmetric (e.g. a pair of y-magnet arrays 12, such as y-magnet array 12B and y-magnet array 12D in the case of the FIG. 13A embodiment) about a plane extending in the stage-y direction and the stage-z direction and passing the center of the space between the two magnet arrays 12B, 12D are designed to have this feature, then the current distribution in the active coil traces 34 for each parallel magnet array 12B, 12D can be substantially similar in spatial distribution (i.e. in phase) based on a suitable commutation law, such as commutation laws described in PCT application No. PCT/CA2012/050751 (published under WO/2013/059934), as the magnet arrays 12B and 12D can form a continuous Halbach array by filling the space in between magnet arrays 12B and 12D with an appropriate number of magnetization segments 14, each of stage-x width $\lambda/4$. The resultant magnetization pattern would be synchronous, which means the magnetization direction rotation change from one magnetization segment to its adjacent magnetization segment neighbor to the right is constant, for the whole of magnet arrays 12B, 12D, and any additional magnetization segments used to fill in the gap.

In some embodiments, the above-discussed spacing parameter $S_{mx}=O_x+S_x$ and/or the spacing parameter $S_{my}=O_y+S_y$ (which may be equal to one another (i.e. $S_{mx}=S_{my}=S_m$)) are is designed to be at least approximately $$S_m = N_S \frac{\lambda}{2} + \frac{\lambda}{4},$$

where $N_S$ is a positive even integer and $\lambda=\lambda_1=\lambda_2$ is the above-discussed spatial period. Where the spacing of adjacent parallel magnet arrays 12 which are mirror symmetric (e.g. a pair of y-magnet arrays 12, such as y-magnet array 12B and y-magnet array 12D in the case of the FIG. 13B embodiment) about a plane extending in the stage-y direction and the stage Z direction and passing the center of the space between two arrays are designed to have this feature, then the current distribution in the active coil traces 34 for each parallel magnet array 12B, 12D can be substantially similar in spatial distribution (i.e. in phase), as the magnet arrays 12D and 12B can form a continuous Halbach array by filling the space in between with appropriate magnetization segments 14, each of stage-x width $\lambda/4$. The resultant magnetization pattern would be synchronous, which means the magnetization direction rotation change from one magnetization segment to its adjacent magnetization segment neighbor to the right is constant, for the whole of magnet arrays 12B, 12D, and any additional magnetization segments used to fill in the gap.

While a number of exemplary aspects and embodiments are discussed herein, those of skill in the art will recognize certain modifications, permutations, additions and sub-combinations thereof. For example:

In this description and the accompanying claims, elements (such as, by way of non-limiting example, stator layers, coil traces, moveable stages and/or magnet arrays) are said to overlap one another in or along a direction. For example, coil traces 32, 34 from different stator layers 40, 42 may overlap one another in or along the stator-direction. When it is described that two or more objects overlap in or along the z-direction, this usage should be understood to mean that a z-direction-oriented line could be drawn to intersect the two or more objects.

In many of the drawings and much of the description provided herein, moveable stages are shown as being static with their stage-x, stage-y and stage-z axes being the same as the stator-x, stator-y and stator-z axes of the corresponding stator. This custom is adopted in this disclosure for the sake of brevity and ease of explanation. It will of course be appreciated from this disclosure that a moveable stage can (and is designed to) move with respect to its stator, in which case the stage-x, stage-y, stage-z axes of the moveable stage may no longer be the same as (or aligned with) the stator-x, stator-y and stator-z axes of its stator. Directions, locations and planes defined in relation to the stator axes may generally be referred to as stator directions, stator locations and stator planes and directions, locations and planes defined in relation to the stage axes may be referred to as stage directions, stage locations and stage planes.

In the description above, stators comprise current carrying coil traces and moveable stages comprise magnet arrays. It is of course possible that this could be reversed—i.e. stators could comprise magnet arrays and moveable stages could comprise current carrying coil traces. Also, whether a component (e.g. a stator or a moveable stage) is actually moving or whether the component is actually stationary will depend on the reference frame from which the component is observed. For example, a stator can move relative to a reference frame of a moveable stage, or both the stator and the moveable stage can move relative to an external reference frame. Accordingly, in the claims that follow, the terms stator and moveable stage and references thereto (including references to stator and/or stage x, y, z-directions, stator and/or stage x, y, z-axes and/or the like) should not be interpreted literally unless the context specifically requires literal interpretation Moreover, unless the context specifically requires, it should be understood that the moveable stage (and its directions, axes and/or the like) can move relative to the stator (and its directions, axes and/or the like) or that the stator (and its directions, axes and/or the like) can move relative to a moveable stage (and its directions, axes and/or the like).

Any of the magnet array assemblies 16 described herein may have their magnet arrays 12 adjusted by adding a full spatial period $\lambda$ thereto or removing a full spatial period $\lambda$ therefrom.

Any of the magnet array assemblies 16 described herein may have their magnet arrays 12 adjusted by adding a full spatial period $\lambda$ thereto or removing a full spatial period $\lambda$ therefrom.

In this description and the accompanying claims, directions may be referred to as being generally orthogonal with other directions, generally parallel to other directions, generally linear and/or the like. In this sense, the word generally ought to provide some degree of variance from perfect orthogonality, parallelism, linearity and/or the like, which can be addressed by suitable engineering tolerances. By way of non-limiting example, generally orthogonal, generally parallel or generally linear may be within ±+2 of orthogonal, parallel or linear.

For the most part, the embodiments described above comprise four magnet arrays in a magnet array assembly and a corresponding moveable stage. This is not necessary. In some embodiments, a moveable stage may comprise any suitable number of magnet arrays.

For example, a moveable stage may comprise more than four magnet arrays or fewer than four magnet arrays.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A displacement device for moving a moveable stage relative to a stator, the displacement device comprising:
 a stator comprising:
  an x-trace layer comprising a plurality of electrically conductive x-traces which extend generally linearly in a stator-x direction across an excitation region;
  a y-trace layer comprising a plurality of electrically conductive y-traces which extend generally linearly in a stator-y direction across the excitation region;
  the x-trace layer and the y-trace layer overlapping one another in a stator-z direction over the excitation region;
  the stator-x direction and the stator-y direction non-parallel to one another and the stator-z direction generally orthogonal to both the stator-x and stator-y directions;
 a moveable stage comprising:
  a first magnet array comprising a plurality of first magnetization segments linearly elongated in a stage-x direction, each first magnetization segment having a corresponding magnetization direction generally orthogonal to the stage-x direction; and
  wherein the first magnet array comprises one or more first pairs of adjacent first magnetization segments, each first pair of adjacent first magnetization segments comprising two first magnetization segments adjacent to one another in a stage-y direction non-parallel to the stage-x direction and wherein, for each first pair of adjacent first magnetization segments:
   each first magnetization segment in the first pair has a corresponding magnetization direction that is oriented at a corresponding angle $\alpha n$ about a corresponding stage-x axis aligned with the stage-x direction as measured from a positive stage-z direction that is generally orthogonal to both the stator-x and stator-y directions and wherein the corresponding angle $\alpha n$ is one of $45°+n90°$ where n is any integer; and
   each first magnetization segment in the first pair has a different magnetization direction; and
 a controller connected to one or more amplifiers, the controller and the one or more amplifiers configured to drive currents in at least one of the x-traces and at least one of the y-traces to move the moveable stage relative to the stator.

2. A displacement device according to claim 1 wherein, for at least one of the one or more first pairs of adjacent first magnetization segments, the two first magnetization segments of the first pair have corresponding magnetization directions which are generally orthogonal to one another.

3. A displacement device according to claim 2 wherein for each of the one or more first pairs of adjacent first magnetization segments, the two first magnetization segments of the first pair have corresponding magnetization directions which are generally orthogonal to one another.

4. A displacement device according to claim 1 wherein the corresponding magnetization direction of each of the plurality of first magnetization segments is oriented at a corresponding angle $\alpha_n$ about a corresponding stage-x axis aligned with the stage-x direction as measured from the positive stage-z direction and wherein the corresponding angle $\alpha_n$ is one of $45°+n90°$ where n is any integer.

5. A displacement device according to claim 4 wherein the corresponding magnetization direction of each of the plurality of first magnetization segments is different from the other corresponding magnetization directions of the plurality of first magnetization segments.

6. A displacement device according to claim 4 wherein starting at a first one of the plurality first magnetization segments at a first stage-x oriented edge of the first magnet array and moving in the stage-y direction across the first magnet array, the integer n associated with the corresponding angle $\alpha_n$ for each of the plurality of first magnetization segments increases by unity for each successive adjacent one of the first magnetization segments in the stage-y direction.

7. A displacement device according to claim 4 wherein the first magnet array consists exclusively of the plurality of first magnetization segments.

8. A displacement device according to claim 1 wherein the first magnet array further comprises one or more axial first magnetization segments, each axial first magnetization segment having a corresponding magnetization direction generally orthogonal to the stage-x direction and oriented in one of: a positive stage-y direction; a negative stage-y direction; a positive stage-z direction; and a negative stage-z direction.

9. A displacement device according to claim 1 wherein the plurality of first magnetization segments comprises a number $N_{tx}=4$ different corresponding magnetization directions.

10. A displacement device according to claim 1 wherein the first magnet array comprises a pair of first sub-arrays separated from one another in the stage-y direction by a non-magnetic gap.

11. A displacement device according to claim 10 wherein each of the first sub-arrays comprises a corresponding sub-array plurality of first magnetization segments and each sub-array plurality of first magnetization segments has features of the plurality of first magnetization segments.

12. A displacement device according to claim 1 wherein a width $W_{my}$ of the first magnet array in the stage-y direction is given by $W_{my}=n\lambda_1/4$ where n is a positive integer and $\lambda_1$ is a first spatial period.

13. A displacement device according to claim 12 wherein the first spatial period $\lambda_1$ is a spatial period associated with a variation of the magnetization directions of the plurality of first magnetization segments across the stage-y direction of the first magnet array.

14. A displacement device according to claim 12 wherein the first spatial period $\lambda_1$ is a spatial period of a first Hallbach array having a plurality of first Hallbach magnetization segments with identical widths, magnetization directions and relative spatial order to those of the plurality of first magnetization segments.

15. A displacement device according to claim 12 wherein, for each of the plurality of first magnetization segments, the width of the first magnetization segment in stage-y direction is $\lambda_1/N$ where N is equal to any one of 4, 8 and 16.

16. A displacement device according to claim 1 wherein, for at least one of the one or more first pairs of adjacent first magnetization segments, the two adjacent first magnetization segments of the at least one of the one or more first pairs abut against each other in the stage-y direction.

17. A displacement device for moving a moveable stage relative to a stator, the displacement device comprising:
- a stator comprising:
  - an x-trace layer comprising a plurality of electrically conductive x-traces which extend generally linearly in a stator-x direction across an excitation region;
  - a y-trace layer comprising a plurality of electrically conductive y-traces which extend generally linearly in a stator-y direction across the excitation region;
  - the x-trace layer and the y-trace layer overlapping one another in a stator-z direction over the excitation region;
  - the stator-x direction and the stator-y direction non-parallel to one another and the stator-z direction generally orthogonal to both the stator-x and stator-y directions;
- a moveable stage comprising:
  - a first magnet array comprising a plurality of first magnetization segments linearly elongated in a stage-x direction, each first magnetization segment having a corresponding magnetization direction generally orthogonal to the stage-x direction and at least two of the first magnetization segments having magnetization directions that are different from one another; and
  - a second magnet array comprising a plurality of second magnetization segments linearly elongated in the stage-x direction, each second magnetization segment having a corresponding magnetization direction generally orthogonal to the stage-x direction and at least two of the second magnetization segments having magnetization directions that are different from one another; and
  - wherein corresponding edges of the first and second magnet arrays elongated in the stage-x direction are spaced apart from one another in a stage-y direction generally orthogonal with the stage-x direction by a spacing parameter $S_m$ given by $$S_m = N_S \frac{\lambda}{2} + \frac{\lambda}{4},$$

where $N_S$ is a positive integer and $\lambda$ is a spatial period; and
- a controller connected to one or more amplifiers, the controller and the one or more amplifiers configured to drive currents in at least one of the x-traces and at least one of the y-traces to move the moveable stage relative to the stator.

18. A method for moving a moveable stage relative to a stator, the method comprising:
- providing a stator comprising:
  - an x-trace layer comprising a plurality of electrically conductive x-traces which extend generally linearly in a stator-x direction across an excitation region;
  - a y-trace layer comprising a plurality of electrically conductive y-traces which extend generally linearly in a stator-y direction across the excitation region;
  - the x-trace layer and the y-trace layer overlapping one another in a stator-z direction over the excitation region;
  - the stator-x direction and the stator-y direction non-parallel to one another and the stator-z direction generally orthogonal to both the stator-x and stator-y directions;
- providing a moveable stage comprising:
  - a first magnet array comprising a plurality of first magnetization segments linearly elongated in a stage-x direction, each first magnetization segment having a corresponding magnetization direction generally orthogonal to the stage-x direction; and
  - wherein the first magnet array comprises one or more first pairs of adjacent first magnetization segments, each first pair of adjacent first magnetization segments comprising two first magnetization segments adjacent to one another in a stage-y direction non-parallel to the stage-x direction and wherein, for each first pair of adjacent first magnetization segments:
    - each first magnetization segment in the first pair has a corresponding magnetization direction that is oriented at a corresponding angle $\alpha_n$ about a corresponding stage-x axis aligned with the stage-x direction as measured from a positive stage-z direction that is generally orthogonal to both the stator-x and stator-y directions and wherein the corresponding angle $\alpha_n$ is one of $45°+n90°$ where n is any integer; and
    - each first magnetization segment in the first pair has a different magnetization direction; and
- driving currents in at least one of the x-traces and at least one of the y-traces to move the moveable stage relative to the stator.

19. A method according to claim 18 wherein, for at least one of the one or more first pairs of adjacent first magnetization segments, the two first magnetization segments of the first pair have corresponding magnetization directions which are generally orthogonal to one another.

20. A method according to claim 18 wherein for each of the one or more first pairs of adjacent first magnetization segments, the two first magnetization segments of the first pair have corresponding magnetization directions which are generally orthogonal to one another.

* * * * *